(12) United States Patent
Ishiyama et al.

(10) Patent No.: US 7,631,256 B2
(45) Date of Patent: Dec. 8, 2009

(54) WEB PAGE DISPLAY SYSTEM, AND IMAGE SERVER AND METHOD OF CONTROLLING THE SAME

(75) Inventors: Eiji Ishiyama, Asaka (JP); Mikio Watanabe, Asaka (JP); Hiroshi Tanaka, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 269 days.

(21) Appl. No.: 10/844,520

(22) Filed: May 13, 2004

(65) Prior Publication Data

US 2004/0230889 A1 Nov. 18, 2004

(30) Foreign Application Priority Data

May 16, 2003 (JP) ............................. 2003-138041
Jun. 6, 2003 (JP) ............................. 2003-161449

(51) Int. Cl.
*G06F 17/21* (2006.01)
*G06F 17/24* (2006.01)

(52) U.S. Cl. ...................... 715/234; 715/200; 715/201; 709/250

(58) Field of Classification Search ............... 715/500.1, 715/501.1, 513, 200, 201, 234; 709/250
See application file for complete search history.

(56) References Cited

U.S. PATENT DOCUMENTS

| | | | | | |
|---|---|---|---|---|---|
| 5,897,644 | A | * | 4/1999 | Nielsen ....................... | 715/513 |
| 6,018,774 | A | * | 1/2000 | Mayle et al. ................ | 709/250 |
| 6,300,947 | B1 | * | 10/2001 | Kanevsky ................... | 715/866 |
| 6,311,197 | B2 | * | 10/2001 | Mighdoll et al. ............ | 715/513 |
| 6,381,748 | B1 | * | 4/2002 | Lin et al. .................... | 725/109 |
| 6,542,936 | B1 | * | 4/2003 | Mayle et al. ................ | 709/250 |
| 6,809,725 | B1 | * | 10/2004 | Zhang ......................... | 345/171 |
| 6,947,162 | B2 | * | 9/2005 | Rosenberg et al. ......... | 358/1.15 |
| 7,062,454 | B1 | * | 6/2006 | Giannini et al. .............. | 705/27 |
| 2003/0182402 | A1 | * | 9/2003 | Goodman et al. ........... | 709/220 |
| 2005/0055727 | A1 | * | 3/2005 | Creamer et al. ............. | 725/105 |

FOREIGN PATENT DOCUMENTS

| | | |
|---|---|---|
| JP | 9-168027 A | 6/1997 |
| JP | 2000-188776 A | 7/2000 |
| JP | 2000-305542 A | 11/2000 |
| JP | 2002-202935 A | 7/2002 |

OTHER PUBLICATIONS

HO-KA-GO, last updated Mar. 26, 1998, Nippon Telegraph and Telephone Corporation, pp. 1-5).*

* cited by examiner

*Primary Examiner*—Joshua D Campbell
(74) *Attorney, Agent, or Firm*—Birch, Stewart, Kolasch & Birch, LLP

(57) ABSTRACT

A Web page is displayed on a display screen of a digital camera. The Web page is composed of an image corresponding to one frame. When a radio button corresponding area is clicked, a http request indicating that the radio button corresponding area is clicked is transmitted from the digital camera to a conversion server. In the conversion server, a Web page in which the clicked radio button corresponding area is marked with a solid circle is generated. A html response representing the generated Web page is transmitted from the conversion server to the digital camera. The Web page in which the clicked radio button corresponding area is marked with a solid circle is displayed on the display screen of the digital camera. The radio button function of the Web page can be substantially utilized.

18 Claims, 41 Drawing Sheets

Fig. 8

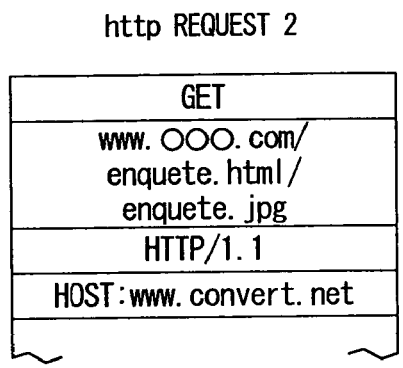

http REQUEST 2

| GET |
|---|
| www.○○○.com/enquete.html/enquete.jpg |
| HTTP/1.1 |
| HOST:www.convert.net |

Fig. 9

```
       convert.net:/www.○○○.com/enquete.html/enquet_modified.html
LINE
   :                                                           61
 1 <BODY>
 2 <IMG SRC="http://convert.net/www.○○○.com/enquete.html/
 3 enqute_modified.jpg" WIDTH="320" HEIGHT="240">
 4 USEMAP="#enquete_map"
 5 <MAP_NAME="enquete_map">
 6 <AREA SHAPE="rect" COORD="40,40,48,48" HREF="http://convert.net/
 7 www.○○○.com/enquete.html/input_radio_1.cgi">
 8 <AREA SHAPE="rect" COORD="72,40,80,48" HREF ="http://convert.net/
 9 www.○○○.com/enquete.html/input_radio_2.cgi">
10 <AREA SHAPE="rect" COORD="112,40,120,48" HREF ="http://convert.net/
11 www.○○○.com/enquete.html/input_radio_3.cgi">
12 <AREA SHAPE="rect" COORD="8,56,24,64" HREF ="http://convert.net/
13 www.○○○.com/enquete.html/input_submit_1.cgi">
14 <AREA SHAPE="rect" COORD="32,56,64,64" HREF ="http://convert.net/
15 www.○○○.com/enquete.html/input_reset_1.cgi">
16 <AREA SHAPE="rect" COORD="8,80,24,88" HREF="/top.html">
17 </MAP>
18 </BODY>
   :
``` convert.net:/www.OOO.com/enquete.html/enquet_modified.jpg $COMMENT="Good"

http REQUEST 3

| GET |
|---|
| www.OOO.com/enquete.html/input_radio_1.cgi |
| HTTP/1.1 |
| HOST:convert.net |

Fig. 13 http REQUEST 4

| GET |
|---|
| www.○○○.com/<br>enquet.html/<br>enquete_modified.jpg |
| HTTP/1.1 |
| HOST:www.convert.net |

Fig. 14 http REQUEST 5

| GET |
|---|
| www.○○○.com/<br>enquete.html/<br>input_submit_1.cgi |
| HTTP/1.1 |
| HOST:convert.net |

Fig. 15 http REQUEST 6

| GET |
|---|
| cgi/send_enquete.cgi?<br>comment=Good |
| HTTP/1.1 |
| HOST:www.○○○.com |

Fig. 16

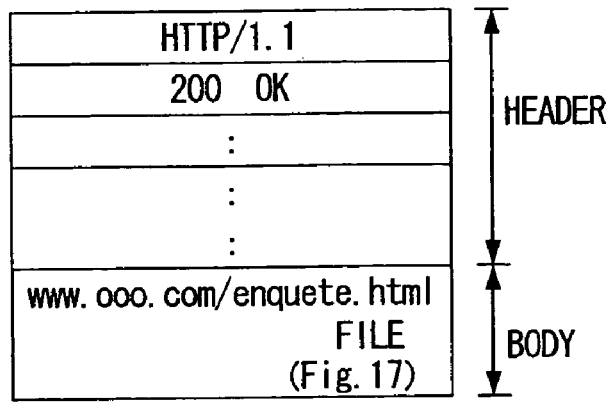

http RESPONSE 1

Fig. 17 www. OOO. com:/enquete. html

LINE          71

:
1 <BODY>
2 <H1>LET US HAVE YOUR COMMENTS</H1>
3 <FORM METHOD="POST" ACTION="/cgi/send-enquete.cgi">
4 COMMENTS :
5 <INPUT TYPE="radio" NAME="comment" VALUE="good">GOOD
6 <INPUT TYPE="radio" NAME="comment" VALUE="normal">NORMAL
7 <INPUT TYPE="radio" NAME="comment" VALUE="bad">BAD
8 <BR>
9 <INPUT TYPE="submit" VALUE="SUBMIT">
10 <INPUT TYPE="reset" VALUE="RESET">
11 </FORM>
12 <P>
13 <A HREF="/top.html">BACK</A>
14 </P>
15 </BODY>
:

Fig. 19 convert.net:/www.OOO.com/enquete.html/enquete.html

LINE

: 72

```
 1 <BODY>
 2 <IMG SRC="http://convert.net/www.OOO.com/enquete.html/
 3 enquete.jpg" WIDTH="320" HEIGHT="240" USEMAP="#enquete_map">
 4 <MAP_NAME="enquete_map">
 5 <AREA SHAPE="rect" COORD="40, 40, 48, 48" HREF="http://convert.net/
 6 www.OOO.com/enquete.html/input_radio_1.cgi">
 7 <AREA SHAPE="rect" COORD="72, 40, 80, 48" HREF ="http://convert.net/
 8 www.OOO.com/enquete.html/input_radio_2.cgi">
 9 <AREA SHAPE="rect" COORD="112, 40, 120, 48" HREF ="http://convert.net/
10 www.OOO.com/enquete.html/input_radio_3.cgi">
11 <AREA SHAPE="rect" COORD="8, 56, 24, 64" HREF ="http://convert.net/
12 www.OOO.com/enquete.html/input_submit_1.cgi">
13 <AREA SHAPE="rect" COORD="32, 56, 64, 64" HREF ="http://convert.net/
14 www.OOO.com/enquete.html/input_rseset_1.cgi">
15 <AREA SHAPE="rect" COORD="8, 80, 24, 88" HREF="/top.html">
16 </MAP>
17 </BODY>
```

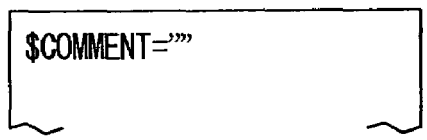

*Fig. 23*
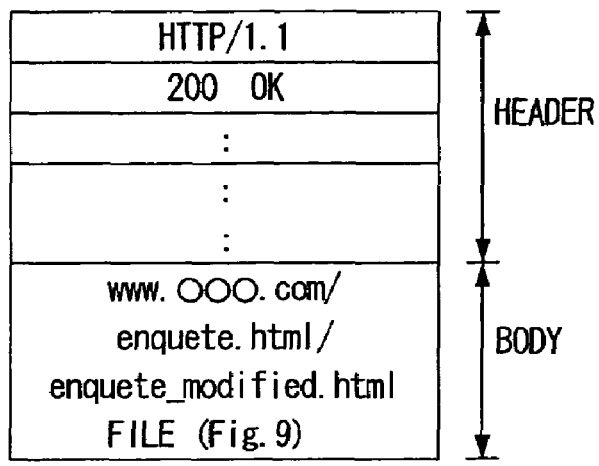
*Fig. 24*
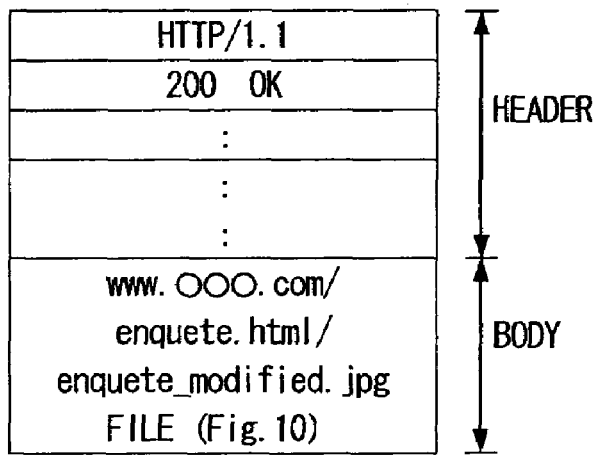
*Fig. 25*
$NAME=""
$COMMENT="Good"

Fig. 26 convert.net:/www.○○○.com/enquete.html/
enquete_modified.html

LINE

74

```
 1 <BODY>
 2 <IMG SRC="http//convert.net/www.○○○.com/enquete.html/
 3 enquete_modified.jpg" WIDTH="320" HEIGHT="240">
 4 USEMAP="#enquete_map"
 5 <MAP NAME="enquete_map">
 6 <AREA SHAPE="rect" COORD="24, 72, 32, 80" HREF="http://convert.net/
 7 www.○○○.com/enquete.html/softkeyboard_grave.cgi">
 8 <AREA SHAPE="rect" COORD="32, 72, 40, 80" HREF="http://convert.net/
 9 www.○○○.com/enquete.html/softkeyboard_1.cgi">
10 <AREA SHAPE="rect" COORD="40, 72, 48, 80" HREF="http://convert.net/
11 www.○○○.com/enquete.html/softkeyboard_2.cgi">
12 <AREA SHAPE="rect" COORD="48, 72, 56, 80" HREF="http://convert.net/
13 www.○○○.com/enquete.html/softkeyboard_3.cgi">
14 <AREA SHAPE="rect" COORD="56, 72, 64, 80" HREF="http://convert.net/
15 www.○○○.com/enquete.html/softkeyboard_4.cgi">
16 <AREA SHAPE="rect" COORD="64, 72, 72, 80" HREF="http://convert.net/
17 www.○○○.com/enquete.html/softkeyboard_5.cgi">
    :   :
    :   :
   </MAP>
   </BODY>
    :
```

```
$NAME=""
$COMMENT="Good"
```

```
$NAME="tanaka"
$COMMENT="Good"
``` http REQUEST

| POST |
| --- |
| cgi/send_enquete.cgi?<br>name=tanaka&comment<br>=Good |
| HTTP/1.1 |
| HOST:www.OOO.com |

*Fig. 33*

```
LINE
 1 <BODY>
 2 <IMG SRC="http://convert.net/www.OOO.com/enquete.html/enquete.jpg"
 3 WIDTH="320" HEIGHT="240" USEMAP="#enquete_map">
 4 <MAP NAME="enquete_map">
 5 <AREA SHAPE="rect" COORD="40.10.152.18" INPUT="text">
 6 <AREA SHAPE="rect" COORD="40.20.42.22" INPUT="radio">
 7 <AREA SHAPE="rect" COORD="80.20.82.22" INPUT="radio">
 8 <AREA SHAPE="rect" COORD="120.20.122.22" INPUT="radio">
 9 <AREA SHAPE="rect" COORD="40.24.80.32" INPUT="submit">
10 <AREA SHAPE="rect" COORD="96.24.136.32" INPUT="reset">
11 <A SHAPE="rect" COORD="24.72.32.80"></A>
12 <A SHAPE="rect" COORD="32.72.40.80">1</A>
13 <A SHAPE="rect" COORD="40.72.48.80">2</A>
14 <A SHAPE="rect" COORD="56.72.64.80">3</A>
      :            :
      :            :
   : <A SHAPE="rect" COORD="24.80.32.80">TAB</A>
   : <A SHAPE="rect" COORD="32.80.40.88">q</A>
   : <A SHAPE="rect" COORD="40.80.48.88">w</A>
      :            :
      :            :
   : <A SHAPE="rect" COORD="24">Ctl</A>
   : <A SHAPE="rect" COORD="8.32.16.40">Alt</A>
 n <A SHAPE="rect" COORD="16.32.24.40">¥</A>
      :            :
 m <AREA SHAPE="rect" COORD="80.58.96.84" INPUT="back">
m+1 </MAP>
m+2 </BODY>
```

Fig. 37

```
LINE
 1 <BODY>
 2 <IMG SRC="http://convert.net/www.OOO.com/enquete.html/enquete.jpg"
 3 WIDTH="320" HEIGHT="120">
 4 <MAP NAME="enquete_map">
 5 <AREA SHAPE="rect" COORD="40.10.152.18" INPUT="text">
 6 <AREA SHAPE="rect" COORD="40.20.42.22" INPUT="radio">
 7 <AREA SHAPE="rect" COORD="80.20.82.22" INPUT="radio">
 8 <AREA SHAPE="rect" COORD="120.20.122.22" INPUT="radio">
 9 <AREA SHAPE="rect" COORD="40.24.80.32" INPUT="submit">
10 <AREA SHAPE="rect" COORD="96.24.136.32" INPUT="reset">
11 </MAP>
12 <A SHAPE="rect" COORD="24.72.32.80" SRC="http://www.OOO.com/keyboard/
13 quate.jpg">'</A>
14 <A SHAPE="rect" COORD="32.72.40.80" SRC="http://www.OOO.com/keyboard/
15 1.jpg">1</A>
16 <A SHAPE="rect" COORD="40.72.48.80" SRC="http://www.OOO.com/keyboard/
17 2.jpg">2</A>
18 <A SHAPE="rect" COORD="56.72.64.80" SRC="http://www.OOO.com/keyboard/
19 3.jpg">3</A>
 :   :
 :  <A SHAPE="rect" COORD="24.80.32.88" SRC="http://www.OOO.com/keyboard/
 :  tab.jpg">TAB</A>
 :  <A SHAPE="rect" COORD="32.80.40.88" SRC="http://www.OOO.com/keyboard/
 :  q.jpg">q</A>
 :  <A SHAPE="rect" COORD="40.80.48.88" SRC="http://www.OOO.com/keyboard/
 :  w.jpg">w</A>
 :   :
 :  <A SHAPE="rect" COORD="24.104.32.112" SRC="http://www.OOO.com/keyboard/
 :  ctl.jpg">Ctl</A>
 :  <A SHAPE="rect" COORD="32.104.40.112" SRC="http://www.OOO.com/keyboard/
 :  alt.jpg">Alt</A>
 :  <A SHAPE="rect" COORD="40.104.48.112" SRC="http://www.OOO.com/keyboard/
 n  yen.jpg">¥</A>
 :   :
 m <IMG SRC="http://convert.net/www.OOO.com/enquete.html/back.jpg"
m+1 WIDTH="320" HEIGHT="60" USEMAP="back_map">
m+2 <MAP NAME="back_map">
m+3 <AREA SHAPE="rect" COORD="80.114.120.120" INPUT="back">
m+4 </MAP>
m+5 </BODY>
```

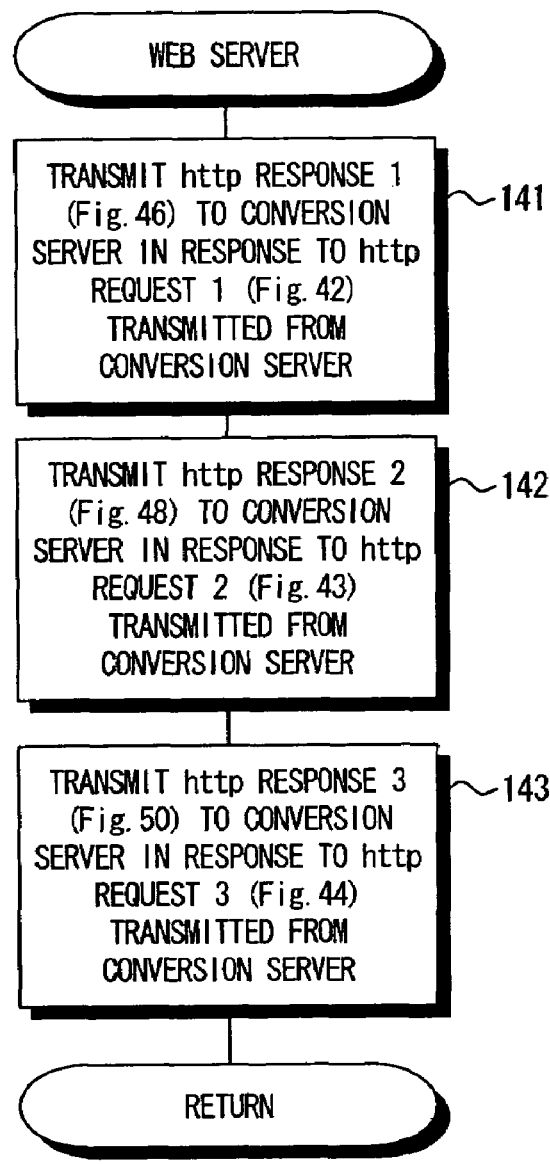

Fig. 43 http REQUEST 2

| GET |
|---|
| tanaka. jpg |
| HTTP/1.1 |
| HOST:www.OOO.com |

Fig. 44 http REQUEST 3

| GET |
|---|
| suzuki. jpg |
| HTTP/1.1 |
| HOST:www.OOO.com |

Fig. 45 http REQUEST 4

| GET |
|---|
| www.ooo.com/member.html/member.jpg |
| HTTP/1.1 |
| HOST:convert.net | www.ooo.com/member.html

LINE
1  <HTML>
2  <HEAD>
3  <TITLE>member list</TITLE>                   151
4  </HEAD>
5  <BODY>
6  <H1>MEMBER INTRODUCTION</H1>
7  <TABLE>
8  <TR>
9  <TD><A HREF="tanaka.html">TANAKA</A></TD>
10 <TD>tanaka@mail.ooo.com</TD>
11 <TD><IMG SRC="image/tanaka.jpg"></TD>
12 </TR>
13 <TR>
14 <TD><A HREF="suzuki.html">SUZUKI</A></TD>
15 <TD>suzuki@mail.ooo.com</TD>
16 <TD><IMG SRC="image/suzuki.jpg"></TD>
17 </TR>
18 <TR>
19 <TD><A HREF="yamada.html">YAMADA</A></TD>
20 <TD>yamada@mail.ooo.com</TD>
21 <TD></TD>
22 </TABLE>
23 <P>
24 <A HREF="top.html">BACK</A>
25 </P>
26 </BODY>
27 </HTML>

MEMBER INTRODUCTION t   ～T1   W

C1— TANAKA | tanaka@mail.ooo.com  T2  ～I1
C2— SUZUKI | suzuki@mail.ooo.com  T3  ～I2
C3— YAMADA | yamada@mail.ooo.com
                                  T4
C4— BACK convert.net/www.ooo.com/member.html/member.html

*Fig. 52*

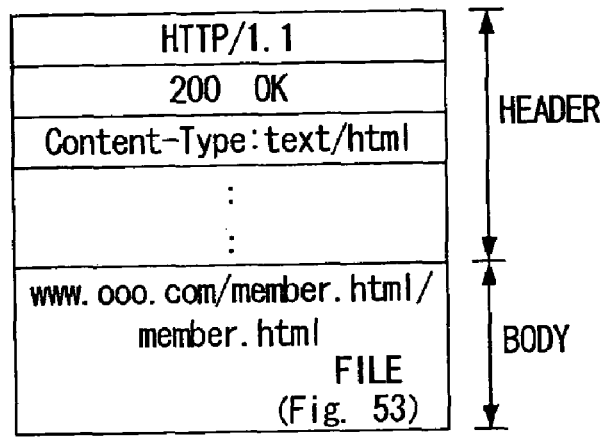

http RESPONSE 4

*Fig. 53*

LAYOUT INFORMATION
(convert. net/www. ooo. com/member. html/member. htm)

LINE
1 <HTML>
2 <HEAD>
3 <TITLE>member list</TITLE>
4 </HEAD>
5 <BODY>
6 <IMG SRC="http://convert. foo. bar/www. ooo. com/member. html/
7 member. jpg" WIDTH="320" HEIGHT="240" USEMAP="#member_map">
8 <MAP NAME="member_map">
9 <AREA SHAPE="rect" COORD="8, 64, 24, 72" HREF="tanaka. html">
10 <AREA SHAPE="rect" COORD="8, 112, 24, 120" HREF="suzuki. html">
11 <AREA SHAPE="rect" COORD="8, 160, 24, 168" HREF="yamada. html">
12 <AREA SHAPE="rect" COORD="8, 176, 24, 184" HREF="top. html">
13 </MAP>
14 </BODY>
15 </HTML>

```
LINE                              P11
1 <HTML>
2 <HEAD>
3 <TITLE>member list</TITLE>
4 </HEAD>
5 <BODY>
```

```
LINE
1  <HTML>
2  <HEAD>
3  <TITLE>member list</TITLE>
4  </HEAD>
5  <BODY>
6  <IMG SRC="http://convert.net/www.ooo.com/member.html/
7  member.jpg" WIDTH="320" HEIGHT="240" USEMAP="#member_map">
8  <MAP NAME="member_map">
9  </MAP>
10 </BODY>
11 </HTML>
```

*Fig. 57A*  LINE
6 <H1>MEMBER INTRODUCTION</H1>   P12

```
     LINE                          P14
     8 <TR>
     9 <TD><A HREF=  "tanaka.html"TANAKA</A>
```

```
LINE
 1 <HTML>
 2 <HEAD>
 3 <TITLE>member list</TITLE>
 4 </HEAD>
 5 <BODY>
 6 <IMG SRC="http://convert.net/www.ooo.com/member.html/
 7 member.jpg" WIDTH="320" HEIGHT="240" USEMAP="#member_map">
 8 <MAP NAME="member_map">
 8.1 <AREA SHAPE="rect" COORD="8, 64, 24, 72" HREF="tanaka.html">
 9 </MAP>
10 </BODY>
11 </HTML>
```

```
     LINE                              P15
     10 <TD>tanaka@mail.ooo.com</TD>
```

```
      LINE                          P16
      11 <TD><IMG SRC="image/tanaka.jpg" </TD>
```

*Fig. 62A*

```
LINE
12  </TR>
13  <TR>
14  <TD><A HREF="suzuki.html">SUZUKI</A> </TD>
```

*Fig. 62B*

MEMBER INTRODUCTION ← 171

| | 172 | ~181 |
|---|---|---|
| TANAKA | tanaka@mail.ooo.com | |
| SUZUKI | | |

```
LINE
 1  <HTML>
 2  <HEAD>
 3  <TITLE>member list</TITLE>
 4  </HEAD>
 5  <BODY>
 6  <IMG SRC="http://convert.net/www.ooo.com/member.html/
 7  member.jpg" WIDTH="320" HEIGHT="240" USEMAP="#member_map">
 8  <MAP NAME="member_map">
 8.1<AREA SHAPE="rect" COORD="8, 64, 24, 72" HREF="tanaka.html">
 8.2<AREA SHAPE="rect" COORD="8, 112, 24, 120" HREF="suzuki.html">
 9  </MAP>
10  </BODY>
11  </HTML>
```

WEB PAGE DISPLAY SYSTEM, AND IMAGE SERVER AND METHOD OF CONTROLLING THE SAME

This Non-provisional application claims priority under 35 U.S.C. § 119(a) on Patent Application No(s). 2003-138041 and 2003-161449 filed in Japan on May 16, 2003 and Jun. 6, 2003, respectively, the entire contents of which are hereby incorporated by reference.

BACKGROUND OF THE INVENTION

1. Field of the Invention

The present invention relates to a Web page display system and an image server, a method of controlling the image server and a program for controlling the image server, and an image display control device, an image display controlling method, and a program for controlling the image display control device.

2. Description of the Background Art

With the development of computer devices, image servers have been accessible from various devices such as not only personal computers but also cellular phones and digital cameras via the Internet. Since the image servers have been accessible from the devices other than the personal computers, various contrivances have been made. For example, when image information is provided to the cellular phone, image data is edited to match a display screen of the cellular phone (see JP-A-2000-188776, for example).

Examples of Web pages are ones having various functions such as a clickable map. Depending on the function provided to the Web page, therefore, some devices can display the Web page but are not operated in conformity with the function of Web page. The function of the Web page cannot, in some cases, be utilized.

Furthermore, all devices which access the image servers cannot necessarily display texts represented by text data. In a case where the device which can display an image but cannot display a text accesses the image server, when text data is transmitted to the device from the image server, a text represented by the text data cannot, in some cases, be suitably displayed.

SUMMARY OF THE INVENTION

An object of the present invention is to make it possible to utilize the function of a Web page.

Another object of the present invention is to make it possible for a device which cannot suitably display a text represented by text data to display the text relatively suitably.

A first aspect of the present invention is directed to a Web page display system comprising an image display control device and an image server which can communicate with each other. Data representing a Web page image including an image area which is an image area corresponding to an action area and is an unclickable area is transmitted from the image server to the image display control device.

The image display control device comprises a display device for displaying on its display screen the Web page image represented by the Web page image data transmitted from the image server, a judgment device (means) for judging whether or not an action corresponding area included in a Web page displayed on the display screen of the display device is clicked, and a first transmission device (means) for transmitting, in response to the judgment by the judgment device (means) that the action corresponding area is clicked, data representing the contents of the click to the image sever.

The image server comprises a generation device (means) for generating data representing a Web page image obtained by updating a portion of the Web page image depending on the contents of the click on the basis of the data representing the contents of the click transmitted from the first transmission device (means) in the image display control device, and a second transmission device (means) for transmitting to the image display control device the Web page image data after the update generated by the generation device (means).

The image display control device and the image server may be independently configured, respectively.

An image server according to a second aspect of the present invention is characterized by comprising a first generation device (means) for generating data representing a Web page image including an image area which is an image area corresponding to an action area and is an unclickable area; a first transmission device (means) for transmitting to an image display control device the Web page image data generated by the first generation device (means); a receiving device (means) for receiving, in response to a click of the action corresponding area included in the Web page image represented by the Web page image data transmitted from the first transmission device (means) in the image display control device, data representing the contents of the click transmitted from the image display control device; a second generation device (means) for generating, on the basis of the data representing the contents of the click received by the receiving device (means), data representing a Web page image obtained by updating a portion of the Web page image depending on the contents of the click; and a second transmission device (means) for transmitting to the image display control device the Web page image data after the update generated by the second generation device (means).

There is also provided a controlling method suitable for the second aspect of the present invention. That is, the method comprises the steps of transmitting to an image display control device data representing a Web page image including an image area corresponding to an action area; receiving, in response to a click of the action corresponding area included in the Web page image represented by the transmitted Web page image data in the image display control device, data representing the contents of the click transmitted from the image display control device; generating, on the basis the received data representing the contents of the click, data representing a Web page image obtained by updating a portion of the Web page image depending on the contents of the click; and transmitting to the image display control device the generated Web page image data after the update.

The present invention also provides a program for carrying out the method of controlling the image server and a recording medium storing the program.

According to the present invention, the image data representing the Web page image including the image area which is the image area corresponding to the action area and is the unclickable area (an area which is not assumed to be clicked, similarly to a normal image area, for example, a button area such as a submit button, which is changed in response to a click or a reset button, or an area with which a link is provided) is transmitted from the image server to the image display control device.

When the Web page image data is received in the image display control device, the Web page image represented by the Web page image data is displayed on the display screen of the display device. The Web page image includes the image area which is the area corresponding to the action area (the action area is an area where a Web page is changed, in response to a click operation or the like by a user, before and after the click operation, for example, a clickable map or a radio button) (the area corresponding to the action area is an area where the action area is not changed directly in response to the click operation or the like by the user but is changed after communication with the image server) and is the unclickable area. It is judged whether or not the action corresponding area is clicked by the user. When it is judged that the action corresponding area is clicked, the data representing the contents of the click is transmitted from the image display control device to the image server.

When the data representing the contents of the click is received in the image server, the data representing the Web page image after the update corresponding to the contents of the click is generated. The generated Web page image data after the update is transmitted from the image server to the image display control device.

On the display screen of the display device in the image display control device, the Web page image whose portion has been updated in response to the click is displayed. Even if the image display control device cannot update the Web page image in response to the operation of the action area, the Web page image after the update can be displayed.

The updated portion of the Web page image after the update may be an area corresponding to the action area, for example, a radio button or a check box.

The action area may correspond to a clickable keyboard. In this case, a character corresponding to the click of the keyboard will be displayed as the updated portion of the Web page image after the update. The updated portion of the Web page image after the update may correspond to an area different from the action area.

The image server may comprise a conversion server and a Web server. In this case, the conversion server will comprise the first transmission device (means), the receiving device (means), and the second transmission device (means), and the Web server will comprise the generation device (means).

An image display control device according to a third aspect of the present invention is characterized by comprising a display device for displaying on its display screen a Web page image represented by Web page image data transmitted from an image server and including a keyboard image area and a text box area; a copying device (means) for copying a character image formed in a clicked key area in the keyboard image area included in the Web page image displayed on the display screen of the display device from the keyboard image area, and a pasting device (means) for pasting to the text box area the character image copied by the copying device (means).

The third aspect of the present invention also provides an image display controlling method suitable for the image display control device. That is, the method comprises the steps of displaying on a display screen of a display device a Web page image represented by Web page image data transmitted from an image server and including a keyboard image area and a text box area; copying a character image formed in a clicked key area in the keyboard image area included in the Web page image displayed on the display screen from the keyboard image area; and pasting the copied character image to the text box area.

The present invention also provides a program for realizing the image display controlling method and a recording medium storing the program.

According to the third aspect of the present invention, the Web page image data is transmitted from the image server to the image display control device. Consequently, the Web page image is displayed on the display screen of the display device in the image display control device. The Web page image includes the keyboard image area and the text box area. When the key area in the keyboard image area is clicked, a character (a letter, a numeral, etc.) formed on the clicked key area is copied. The copied character is pasted to the text box area.

According to the third aspect of the present invention, every time the key area is clicked, the character formed in the clicked key area is displayed in the text box area without establishing communication between the image display control device and the image server.

The Web page image may be an image corresponding to a plurality of frames which are independent for key areas composing the keyboard image area.

Since the key areas are respectively independent, the necessity of designating, in order to copy the character formed on the key area, a range in which the character is to be copied is eliminated. The character formed on the key area can be copied with relative ease.

There may be further provided a transmission device (means) for transmitting data representing the character displayed in the text box area from the image display control device to the image server by giving a transmission command. The character inputted in the image display control device can be recognized in the image server.

A fourth aspect of the present invention is characterized by comprising, in an image server which can communicate with an image display control device, a receiving device (means) for receiving a Web page request transmitted from the image display control device; a generation device (means) for generating image data representing a Web page in which a text included in a Web page corresponding to the Web page request received by the receiving device (means) and represented by text data is imaged; and a first transmission device (means) for transmitting to the image display control device the Web page image data generated by the generation device (means).

The fourth aspect of the present invention also provides a controlling method suitable for the image server. That is, the method comprises, in an image server which can communicate with an image display control device, the steps of receiving a Web page request transmitted from the image display control device; generating image data representing a Web page in which a text included in a Web page corresponding to the received Web page request and represented by text data is imaged; and transmitting to the image display control device the generated Web page image data.

The fourth aspect of the present invention also provides a program suitable for the method of controlling the image server and a recording medium storing the program.

According to the forth aspect of the present invention, the Web page request is transmitted from the image display control device to the image server. When the Web page request is received in the image server, the image data representing the Web page in which the text included in the Web page corresponding to the received Web page request is imaged is generated. The generated Web page image data is transmitted from the image server to the image display control device.

When the Web page corresponding to the Web page request includes the text represented by the text data, the image data representing the Web page in which the text is imaged is generated. Even when the image display control device cannot display the text represented by the text data, it can display the text as an image. Even the image display control device which cannot display the text represented by the text data can see the contents of the text represented by the text data.

There may be further provided a first judgment device (means) for judging whether or not the text represented by the text data is included in the Web page corresponding to the Web page request. In this case, the generation device (means) will generate, in response to the judgment by the first judgment device (means) that the text represented by the text data is included in the Web page, the image data representing the Web page in which the text is imaged.

There may be further provided a second judgment device (means) for judging whether or not a clickable area is included in the Web page corresponding to the Web page request received by the receiving device (means). In this case, the generation device (means) will generate, in response to the judgment by the second judgment device (means) that the clickable area is included, image data representing the Web page in which the clickable area is imaged as a clickable map.

Preferably, the image display control device transmits, in response to a click of the displayed clickable map, data indicating that the clickable map is clicked to the image server. In this case, image data representing the Web page after the update is generated in response to the receiving of the data indicating that the clickable map is clicked in the image server.

The image server may comprise a conversion server and a Web server. In this case, the conversion server will comprise the receiving device (means), the generation device (means), the first transmission device (means), and second transmission device (means) for transmitting to the Web server a request for material data composing the Web page image represented by the Web page image data.

The Web server will comprise a third transmission device (means) for transmitting the material data to the conversion server depending on the material data request transmitted from the second transmission device (means) in the conversion server.

Furthermore, the generation device (means) in the conversion server will generate the Web page image data using the material data transmitted from the third transmission device (means) in the Web server.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 7 and 8 respectively illustrate examples of a http request;

FIG. 9 illustrates an example of layout information;

FIG. 10 illustrates an example of a layout image;

FIG. 11 illustrates an example of contents stored in a variable area of an entry item;

FIGS. 12 to 15 respectively illustrate examples of a http request;

FIG. 16 illustrates an example of a http response;

FIG. 17 illustrates a html file;

FIG. 19 illustrates an example of layout information;

FIG. 20 illustrates an example of contents stored in a variable area of an entry item;

FIGS. 21 to 24 respectively illustrate examples of a http response;

FIG. 25 illustrates an example of contents stored in a variable area of an entry item;

FIG. 26 illustrates an example of layout information;

FIG. 33 illustrates an example of layout information;

FIG. 37 illustrates an example of layout information;

FIG. 41 is a flow chart showing the procedure for processing of a Web server;

FIGS. 42 to 46 respectively illustrate examples of a http request;

FIG. 47A illustrates an example of the contents of a html file, and FIG. 47B illustrates an example of a Web page represented by a html file;

FIG. 52 illustrates an example of a http response;

FIG. 53 illustrates an example of layout information;

FIG. 62A illustrates the contents of a part of a html file, FIG. 62B illustrates a part of a layout image, and FIG. 62C illustrates a part of layout information.

DESCRIPTION OF THE PREFERRED EMBODIMENTS (1) First Embodiment

Figure 1:
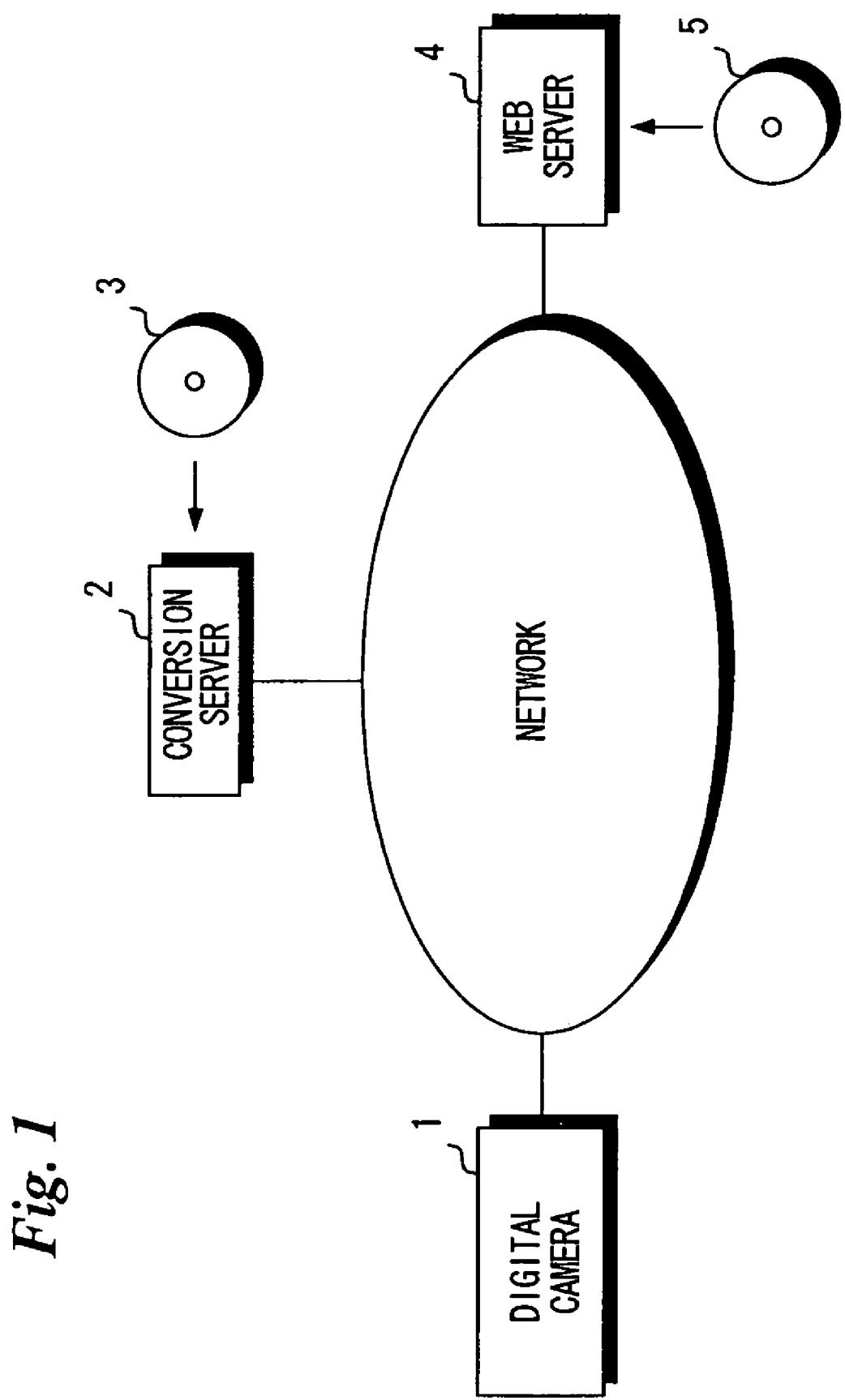
FIG. 1 illustrates the outline of a Web page display system.

FIG. 1 illustrates the outline of a Web page display system according to an embodiment of the present invention.

The Web page display system comprises a digital camera 1, a conversion server (a proxy server) 2, and a Web server 4.

The digital camera 1, the conversion server 2, and the Web server 4 are connected to a network.

A CD-ROM (Compact Disc Read-Only Memory) 3 stores an operation program for the conversion server 2, as described later. The conversion server 2 is loaded with the CD-ROM 3, and the operation program stored in the CD-ROM 3 is installed in the conversion server 2, so that the conversion server 2 is operated, as described later. Similarly, a CD-ROM 5 stores an operation program for the Web server 4. The Web server 4 is loaded with the CD-ROM 5, and the operation program stored in the CD-ROM 5 is installed in the Web-server 4, so that the Web server 4 is operated, as described later.

Each of the digital camera 1, the conversion server 2, and the Web server 4 comprises a communication circuit (not shown) for connection to the network. Further, each of the conversion server 2 and the Web server 4 comprises a CPU, a memory, a CD-ROM driver, a display device, a keyboard (any of which are not shown), and so on.

The digital camera 1 comprises a display device (not shown). The digital camera 1 cannot realize a function, peculiar to a Web page, such as a radio button in many cases. Therefore, the digital camera 1 cannot, in some cases, realize the function peculiar to the Web page even if it can communicate with the Web server 4. In the present embodiment, the digital camera 1 realizes the function peculiar to the Web page.

Figure 2:
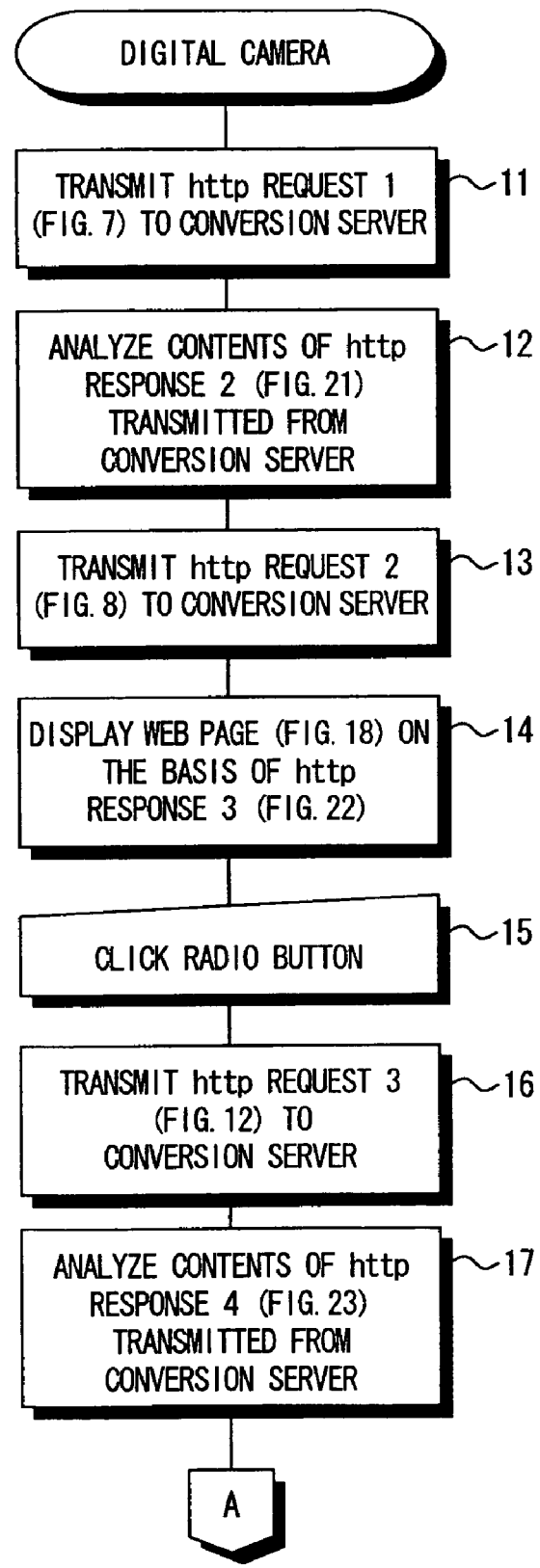
FIGS. 2 and 3 are flow charts showing a part of the procedure for processing of a digital camera.
Figure 3:
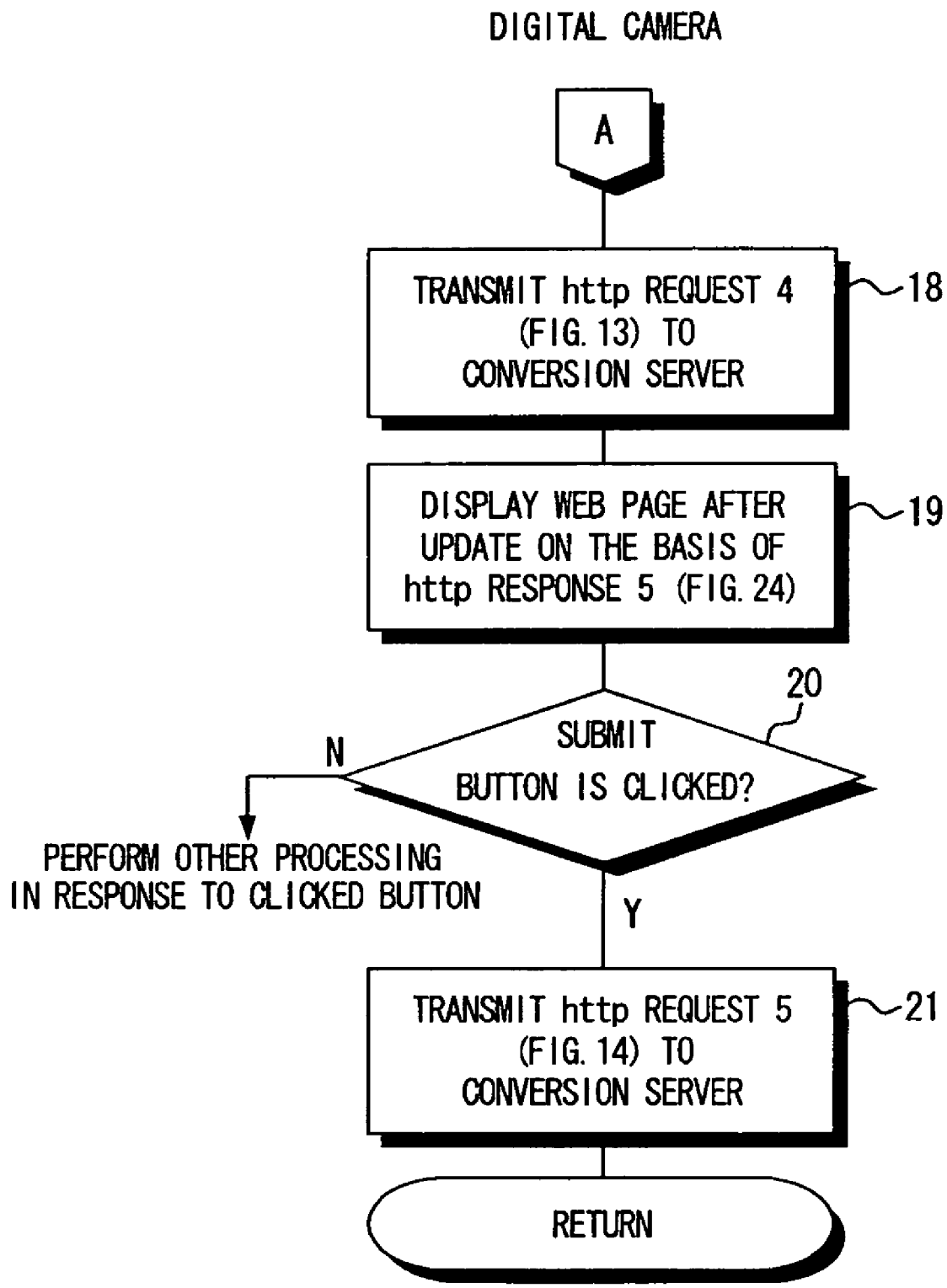
Figure 4:
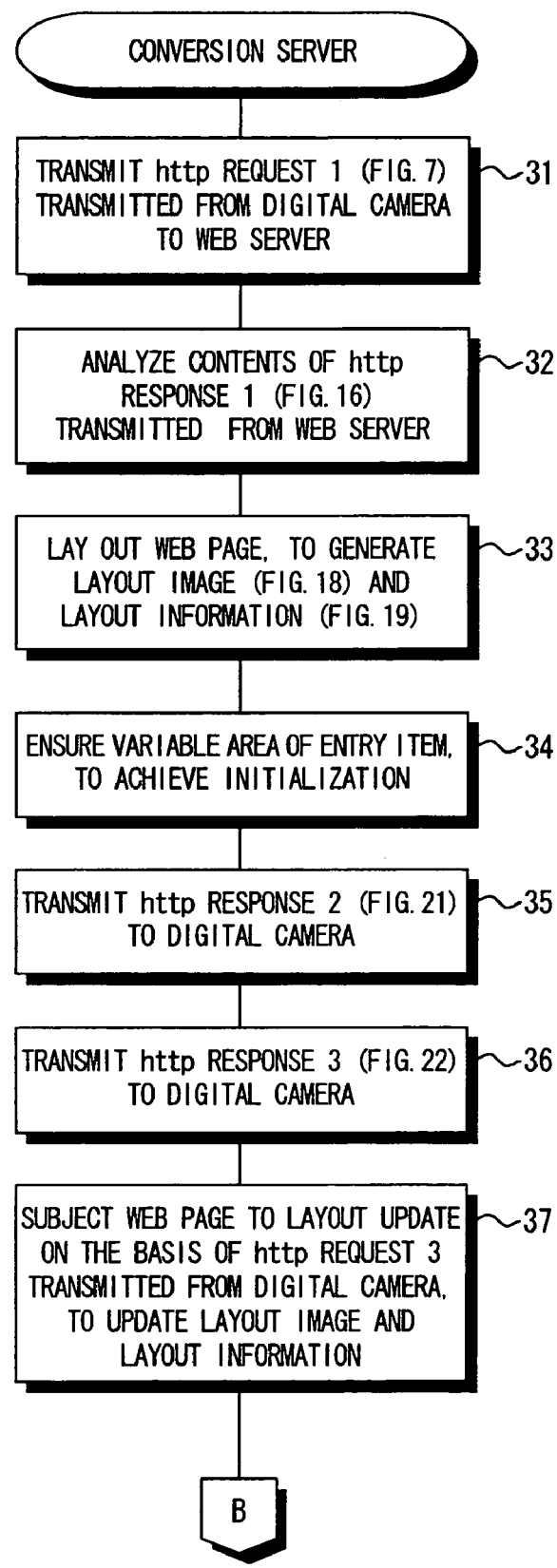
FIGS. 4 and 5 are flow charts showing a part of the procedure for processing of a conversion server.
Figure 5:
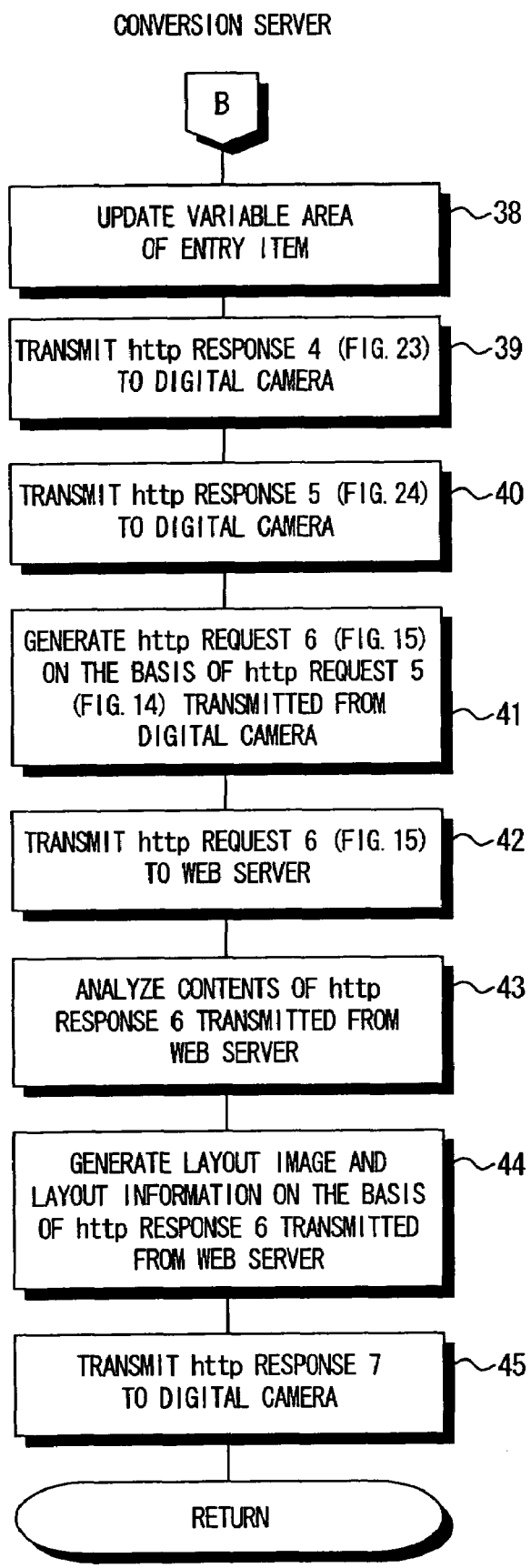
Figure 6:
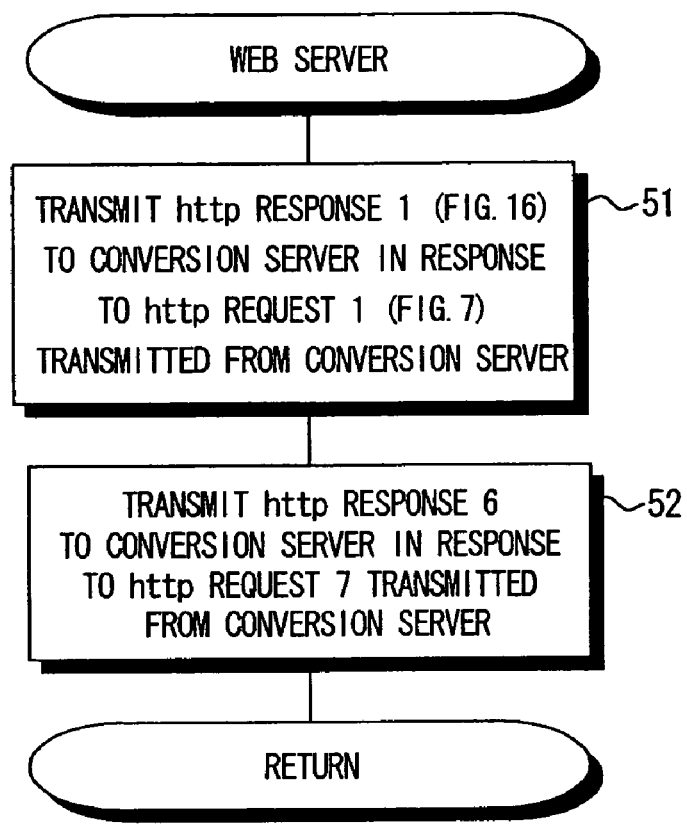
FIG. 6 is a flow chart showing the procedure for processing of a Web server.

FIGS. 2 and 3 are flow charts showing the procedure for processing of the digital camera 1, FIGS. 4 and 5 are flow charts showing the procedure for processing of the conversion server 2, and FIG. 6 is a flow chart showing the procedure for processing of the Web server 4.

In processing, described below, a http (hyper-text transfer protocol) request for acquiring a Web page is transmitted from the digital camera 1 to the conversion server 2. The http request is transmitted from the conversion server 2 to the Web server 4. In the Web server 4, a http response corresponding to the http request is generated. The generated http response is transmitted from the Web server 4 to the conversion server 2. In the conversion server 2, a file included in the http response transmitted from the Web server 2 is a html (hyper-text markup language) file, which is converted into an image file representing the Web page. The image file obtained by the conversion is transmitted from the conversion server 2 to the digital camera 1. Even the digital camera which cannot display a text represented by text data can see a text included in the Web page because the text is displayed as an image.

Particularly in the Web page display system according to the present embodiment, when the Web page includes an action area (an area, where a Web page is changed in response to an action taken by a user, such as a radio button or a clickable map shall be referred to as an action area), the Web page which has been updated in response to a click of the action area is generated in the conversion server 2. Image data representing the generated Web page is transmitted from the conversion server 2 to the digital camera 1. On a display screen of the display device in the digital camera 1, the Web page which has been updated in response to the action taken by the user is displayed. Even a digital camera having no function of realizing the function of a Web page can simultaneously display a Web page corresponding to the function of the Web page.

Let convert.net be the address of the conversion server 2, and let www.○○○.com be the address of the Web server 4.

Figure 7:
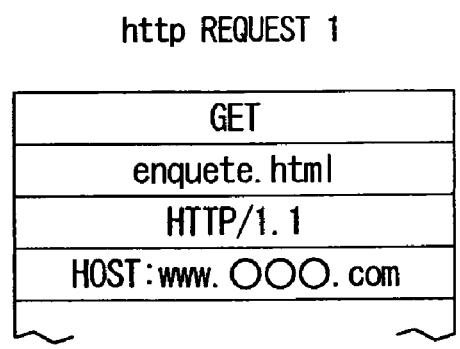

A first http request for acquiring a Web page is first transmitted from the digital camera 1 to the conversion server 2 (step 11 in FIG. 2: The digital camera 1 is set so as to access not the Web server 4 but the conversion server 2). The contents of the first http request are shown in FIG. 7. The first http request includes a command (GET) to acquire the Web page, the name (enquete.html) of a file representing the Web page to be acquired, the version (HTTP1.1) of http, the address (HOST:www.○○○.com) of the Web server 4 storing the file representing the Web page to be acquired, etc.

When the first http request transmitted from the digital camera 1 is received in the conversion server 2, the received http request is transmitted from the conversion server 2 to the Web server 4 (step 31 in FIG. 4).

When the first http request transmitted from the conversion server 2 is received in the Web server 4, a first http response shown in FIG. 16 is generated in response to the received first http request (step 51 in FIG. 6). The first http response includes a header and a body. The header includes the version (HTTP/1.1) of the first http response, a status code (200 OK), etc. The body stores a html file (www.○○○.com/enquete.html) representing a Web page requested by the first http request. A part (a body portion) of the contents of the html file is illustrated in FIG. 17.

As can be seen from the second line in FIG. 17, a character string "Let us have your comments" is displayed in an upper part of an image represented by the html file 71. As can be seen from the fourth line, a character string "comments" is displayed on a line under the character string "Let us have your comments". As can be seen from the fifth to seventh lines, radio buttons are respectively displayed in correspondence with character strings "Good", "Normal", and "Bad". Further, as can be seen from the ninth and tenth lines, buttons having character strings "Submit" and "Reset" displayed thereon are respectively displayed. Further, as can be seen from the 13-th line, a character string "Back" is displayed, so that an area linked to a top.html file is displayed.

The first http response generated in such a way is transmitted from the Web server 4 to the conversion server 2 (step 51 in FIG. 6).

Figure 18:
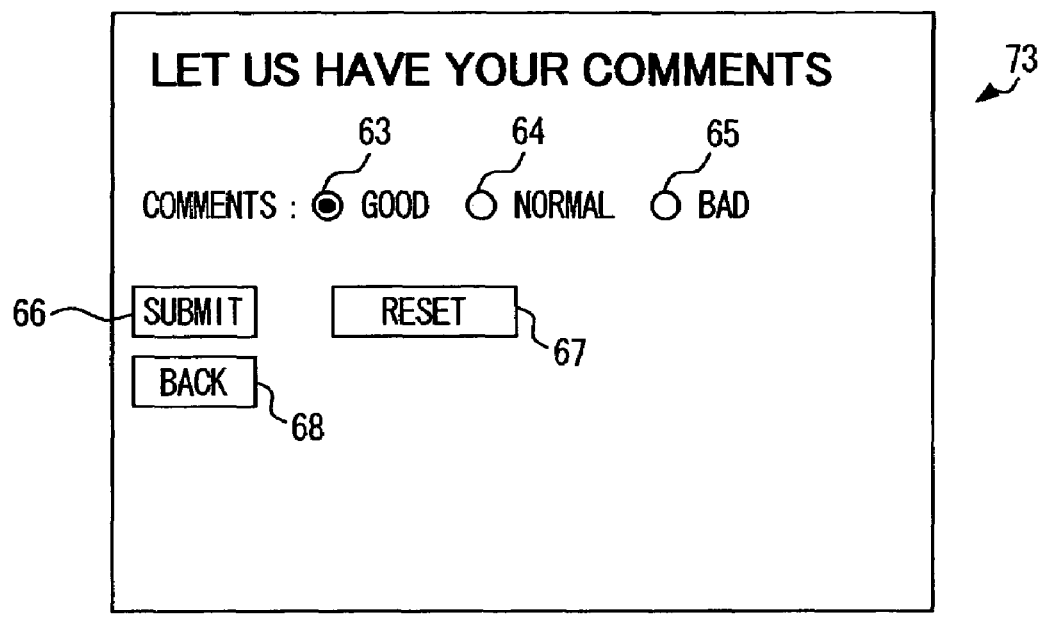
FIG. 18 illustrates an example of a layout image.

When the first http response transmitted from the Web server 4 is received in the conversion server 2, the contents of the first http response are analyzed in the conversion server 2 (step 32 in FIG. 4). On the basis of the analysis, the Web page represented by the html file stored in the first http response is laid out, to generate a layout image shown in FIG. 18 and layout information shown in FIG. 19 (step 33 in FIG. 4). The Web page represented by the html file shown in FIG. 17 is one on which a radio button is entered by the user, the contents of a click is transmitted in response to the click, and a Web page at a destination of a link is displayed in response to the click, for example, as described above. However, the layout image shown in FIG. 18 is an image corresponding to one frame, and does not have a radio button function, a button function, a link function, and so on. In the present embodiment, when an area, corresponding to the radio button, of the layout image, for example, is clicked by a user of the digital camera 1, data representing the contents of the click is fed from the digital camera 1 to the conversion server 2. In the conversion server 2, a http response storing an image file representing a Web page (a layout image) after the click is generated, and the generated http response is transmitted to the digital camera 1. On the display screen of the digital camera 1, the Web page which has been updated in response to the click is displayed.

In a layout image 73 shown in FIG. 18, a character string "Let us have your comments" is displayed in its upper part, and a character string "comments" is displayed under the character string "Let us have your comments". The character strings are respectively not texts represented by text data but imaged characters, as described above.

Areas 63, 64, and 65 respectively corresponding to first, second, and third radio buttons are displayed on the right side of the character string "comments". The areas 63, 64, and 65 corresponding to the radio buttons do not actually have radio button functions. When the area 63, 64, or 65 is clicked, however, an image having a mark, indicating that the area is clicked, displayed thereon is generated in the conversion server 2, as described above. Character strings "Good", "Normal", and "Bad" are respectively displayed in correspondence with the areas 63, 64, and 65.

Furthermore, an area 66 corresponding to a button having characters "Submit" displayed thereon, an area 67 corresponding to a button having characters "Reset" displayed thereon, and an area 68 corresponding to a link having characters "Back" displayed thereon are displayed.

It should be understood that the layout image 73 shown in FIG. 18 can be generated from the above-mentioned html file 71 shown in FIG. 17.

Referring to layout information 72 shown in FIG. 19, the first to third lines indicate a basic image serving as a base of a Web page. The basic image has 320 pixels in width by 240 pixels in height, and is previously determined. The fifth to sixth lines, the seventh to eighth lines, and the ninth to tenth lines (generated from the fifth, sixth, and seventh lines of the html file 71 shown in FIG. 17) indicate that the radio button corresponding areas 63, 64, and 65 in the layout image 73 shown in FIG. 18 are respectively areas corresponding to radio buttons. In response to a click of the radio button corresponding areas 63, 64, and 65, therefore, images respectively representing the radio buttons after the click are generated.

The 11-th and 12-th lines and the 13-th and 14-th lines of the layout information 72 (generated from the ninth and tenth lines of the html file shown in FIG. 17) indicate that the button corresponding areas 66 and 67 in the layout image 73 shown in FIG. 18 are respectively areas corresponding to buttons. The 15-th line of the layout information 72 (generated from the 13-th line of the html file shown in FIG. 17) indicates that the link corresponding area 68 in the layout image 73 shown in FIG. 18 is a link area.

Returning to FIG. 4, when the layout image 73 and the layout information 72 are generated in the conversion server 2, a variable area of an entry item is ensured in the memory of the conversion server 2, to achieve initialization (step 34).

FIG. 20 illustrates a part of the variable area. The variable area (comment) stores the results of a check of the radio button corresponding areas 63, 64, and 65 included in the layout image 73, described above. When the area 63 is checked, GOOD is stored in the variable area (comment). When the other area 64 or 65 is checked, a comment corresponding to the area is stored.

Figure 21:
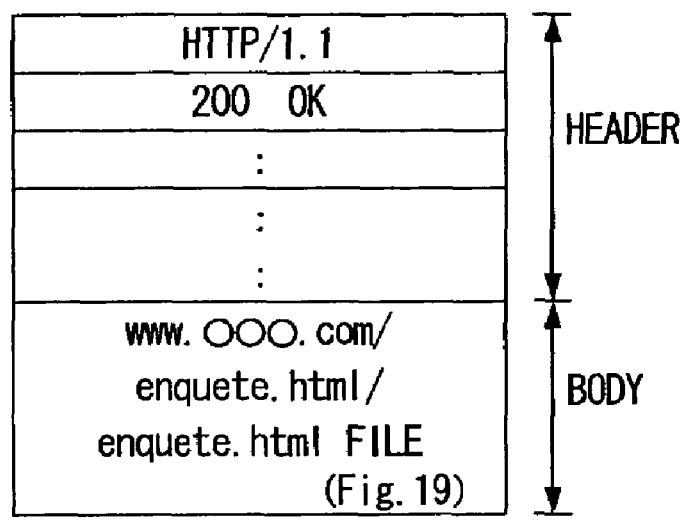

When the layout image 73 and the layout information 72 are generated in the conversion server 2, a second http response (see FIG. 21) having the layout information 72 stored in its body is transmitted from the conversion server 2 to the digital camera 1 (step 35 in FIG. 4). As shown in FIG. 21, the second http response also has version information (HTTP/1.1), a status code (200 OK), etc. included in its header.

When the second http response transmitted from the conversion server 2 is received in the digital camera 1, the contents thereof are analyzed in the digital camera 1 (step 12 in FIG. 2). A second http request (see FIG. 8) is transmitted from the digital camera 1 to the conversion server 2 in accordance with the results of the analysis of the contents (step 13 in FIG. 2). The second http request also includes a command (GET) to acquire a Web page, a file (www.○○○.com/enquete.html/enquete.jpg) representing an image obtained by imaging the Web page to be acquired, the version (HTTP/1.1) of http, the address (HOST:www.convert.net) of a server storing the file representing the Web page to be acquired, etc, similarly to the first http request.

Figure 22:
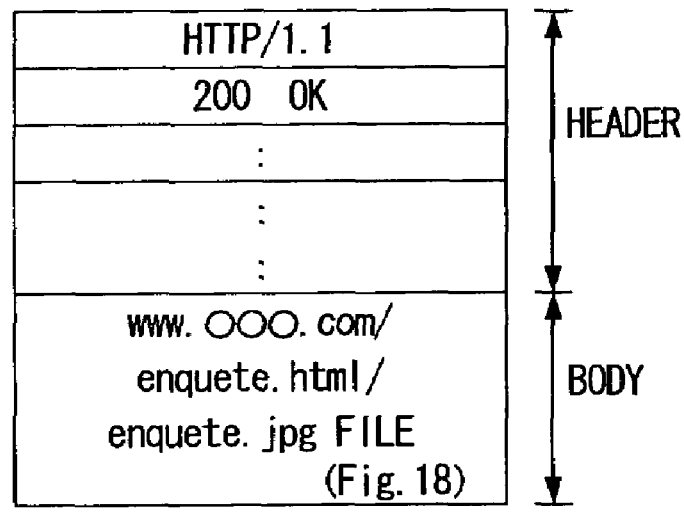

When the second http request is received in the conversion server 2, a third http response (see FIG. 22) is generated in response to the second http request in the conversion server 2. The third http response has an image file representing the layout image 73 stored in its body, as shown in FIG. 22. The generated third http response is transmitted from the conversion server 2 to the digital camera 1 (step 36 in FIG. 4).

When the third http response transmitted from the conversion sever 2 is received in the digital camera 1, the imaged Web page (the layout image 73 in FIG. 18) represented by the image file stored in the body of the third http response is displayed on the display screen of the digital camera 1.

Figures 10, 11, 12:
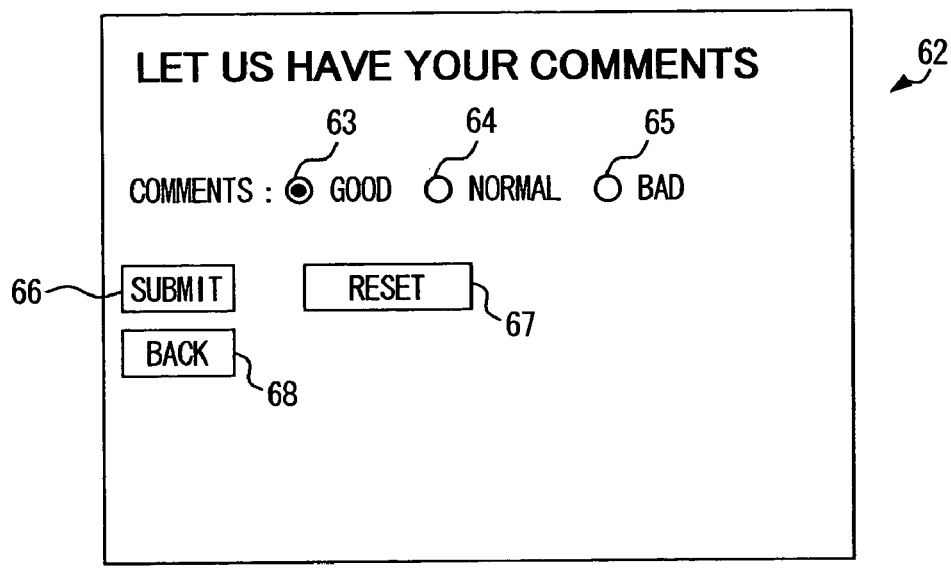

When the radio button corresponding area 63 in the layout image 73 displayed on the display screen of the digital camera 1 is clicked (step 15 in FIG. 2), a third http request shown in FIG. 12 is generated. The third http request includes a command (GET) to acquire a Web page, a file to be acquired (www.○○○.com/enquete.html/input#radio#1/cgi, which indicates that the first radio button corresponding area 63 is clicked. It is judged on the basis of the layout information that the first radio button corresponding area 63 is clicked), the version (HTTP/1.1) of http, the address (HOST:www.convert.net) of a server storing a file representing the Web page to be acquired, etc. The generated third http request is transmitted from the digital camera 1 to the conversion server 2 (step 16 in FIG. 2).

When the third http request transmitted from the digital camera 1 is received in the conversion server 2, the Web page is subjected to layout update in the conversion server 2, to update the layout image and the layout information (step 37 in FIG. 4).

FIG. 9 illustrates layout information 61 after the update, and FIG. 10 illustrates a layout image 62 after the update.

The contents of the layout information 61 after the update (/www.○○○.com/enquete.html/enquete#modified.html) are the same as the contents of the layout information 72 before the update (/www.○○○.com/enquete.html/enquete.html) shown in FIG. 19 because the function of the Web page is not changed. A file name is changed.

In the layout image 62 after the update shown in FIG. 10, a first radio button corresponding area 63 is marked with a solid circle in response to a click of the first radio button corresponding area 63 by the user of the digital camera 1.

A variable area of an entry item in the conversion server 2 is then updated (step 38 in FIG. 5). As shown in FIG. 11, GOOD is stored in a variable area (comment) in correspondence with the clicked first radio button corresponding area 63.

A fourth http response shown in FIG. 23 is generated in the conversion server 2. The generated fourth http response is transmitted from the conversion server 2 to the digital camera 1 (step 39 in FIG. 5). The fourth http response has the layout information 61 after the update (see FIG. 9) stored in its body, as shown in FIG. 23.

When the fourth http response transmitted from the conversion server 2 is received in the digital camera 1, the contents thereof are analyzed in the digital camera 1 (step 17 in FIG. 2). A fourth http request shown in FIG. 13 is generated in response to the analysis. The fourth http request is for requesting the layout image after the update to be transmitted, and stores a file name (/www.○○○.com/enquete.html/enquete#modified.jpg) of the layout image to be requested.

The generated fourth http request is transmitted from the digital camera 1 to the conversion server 2 (step 18 in FIG. 3).

When the fourth http request transmitted from the digital camera 1 is received in the conversion server 2, a fifth http response shown in FIG. 24 is generated in the conversion server 2. The fifth http response has an image file (/www.○○○.com/enquete.html/enquete#modified.jpg) representing the layout image 62 after the update shown in FIG. 10, described above, stored in its body.

The fifth http response transmitted from the conversion server 2 is received in the digital camera 1, to display the layout image (the first radio button corresponding area 63 marked with a solid circle) 62 after the update on the display screen of the digital camera 1 (step 19 in FIG. 3). The user of the digital camera 1 can confirm that a click is made.

When the user of the digital camera 1 clicks a clickable map corresponding area 66 in the layout image 62 (YES in step 20 shown in FIG. 3), a fifth http request shown in FIG. 14 is transmitted from the digital camera 1 to the conversion server 2 (step 21 in FIG. 3). The fifth http request shown in FIG. 14 stores data (/www.○○○.com/enquete.html/input#submit#1.cgi) representing the designation of a function corresponding to the clickable map corresponding area 66. When the other area in the layout image 62 is clicked (NO in step 20 in FIG. 3), processing corresponding to the clicked area is performed.

When the fifth http request transmitted from the digital camera 1 is received in the conversion server 2, a sixth http request shown in FIG. 15 is generated in response to the fifth http request. The sixth http request is for reporting to the Web server 4 an operation (a click of the first radio button corresponding area 63) performed by the user of the digital camera 1. The sixth http request shown in FIG. 15 stores contents (comment=GOOD, etc.) operated by the user of the digital camera 1. The sixth http request generated by the conversion server 2 is transmitted to the Web server 4 (step 42 in FIG. 5).

When the sixth http request transmitted from the conversion server 2 is received in the Web server 4, the contents of the sixth http request are stored in the memory of the Web server 4. For example, the results of a questionnaire grasped from the contents of the sixth http request are stored in the Web server 4. Further, in the Web server 4, a sixth http response (not shown) indicating that the sixth http request is acquired is generated in response to the sixth http request. The generated sixth http response is transmitted from the Web server 4 to the conversion server 2 (step 52 in FIG. 6).

When the sixth http response transmitted from the Web server 4 is received in the conversion server 2, the contents of the sixth http response are analyzed in the conversion server 2 (step 43 in FIG. 5). When it is confirmed that the sixth http request is received in the Web server 4 as a result of the analysis of the sixth http response, a layout image for termination indicating that data representing an operation performed by the user of the digital camera 1 is received (e.g., a layout image in which a character string "Thank you very much for returning your questionnaire" is imaged) and layout information representing the layout image are generated in the Web server 4 (step 44 in FIG. 5). A seventh http response (not shown) storing the generated layout image and layout information, for example, is generated in the conversion server 2, and the generated seventh http response is transmitted to the digital camera 1 (step 45 in FIG. 5).

The layout image for termination is displayed on the display screen of the digital camera 1. The user of the digital camera 1 can confirm that data representing his or her own operation is transmitted to the Web server 4 by seeing the layout image for termination displayed on the display screen.

Even in the digital camera 1 which cannot realize a radio button function, the radio button function can be substantially realized.

FIGS. 25 to 31 illustrate a modified example.

Although in the above-mentioned embodiment, the Web page displayed on the display screen of the digital camera 1 is updated in response to the click of the radio button, a keyboard is displayed on the display screen of the digital camera 1, and a corresponding character string is entered and displayed in response to a click of each of keys composing the keyboard in the modified example.

In the same manner as described above, a variable area of an entry item shown in FIG. 25 is ensured in the memory of the conversion server 2. The variable area of the entry item includes a name and a comment. The comment stores a variable GOOD in response to a click by a user, as described above.

Figures 27, 28:
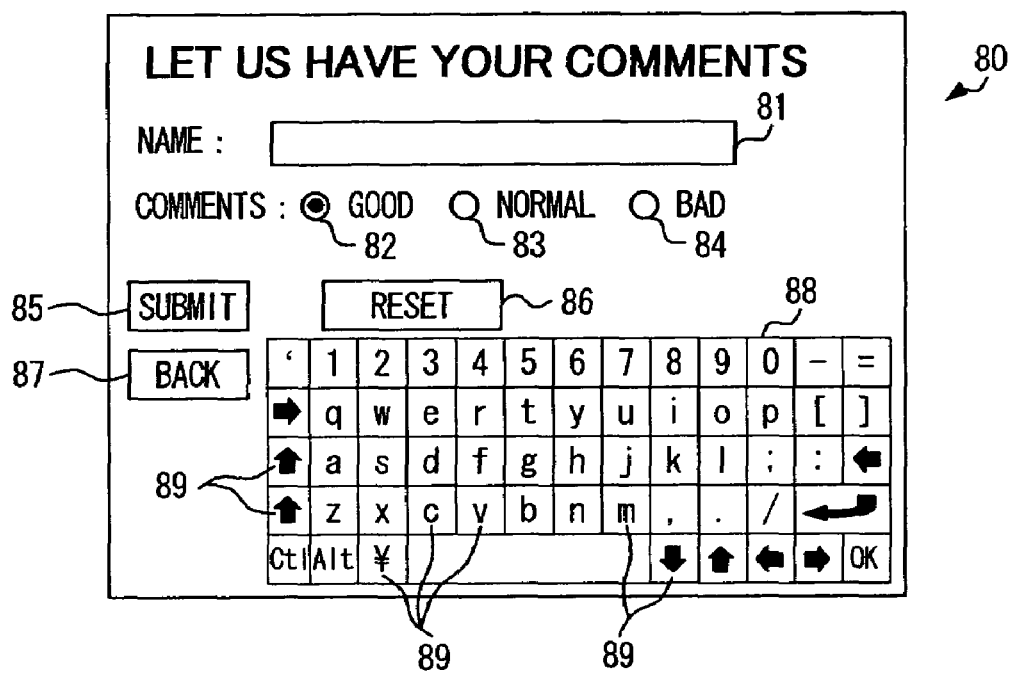
FIG. 27 illustrates an example of a layout image.
FIG. 28 illustrates an example of contents stored in a variable area of an entry item.

In the same manner as described above, a html file for displaying a Web page corresponding to FIG. 27 is transmitted from the Web server 4 to the conversion server 2 in response to a http request transmitted from the digital camera 1 to the Web server 4 through the conversion server 2. In the conversion server 2, layout information 74 shown in FIG. 26 and a layout image 80 shown in FIG. 27 are generated from the html file.

The layout image 80 shown in FIG. 27 is an image corresponding to one frame, similarly to the layout images 62 and 73 shown in FIGS. 10 and 18, and has the function of a Web page, such as a button, not actually but spuriously, as described above.

The layout image 80 includes a name display area 81, a comment (good) display area 82, a comment (normal) display area 83, a comment (bad) display area 84, a submit button display area 85, a reset button display area 86, and a back button display area 87.

The layout image 80 further includes a clickable keyboard 88. The clickable keyboard 88 comprises a lot of key images 89. The clickable keyboard 88 is a spurious clickable map. As in the above-mentioned embodiment, any one of the key images 89 in the keyboard 88 is clicked, to generate a layout image which is a Web page after the click in the conversion server 2. A http response representing the generated layout image is transmitted to the digital camera 1, to display the layout image which is the Web page after the click on the display screen of the digital camera 1.

The layout image 74 shown in FIG. 26 indicates the function of the layout image 80 shown in FIG. 27. As in the layout information 61 shown in FIG. 9, described above, the second to fourth lines indicate a base image of the layout image 80 shown in FIG. 27. The sixth and seventh lines indicate that the key image 89 at the upper left corner of the keyboard 88 corresponds to a clickable map. Similarly, the eighth and ninth lines, the tenth and 11-th lines, the 12-th and 13-th lines, the 14-th and 15-th lines, and the 16-th and 17-th lines respectively indicate that the second, third, fourth, fifth, sixth, and seventh key images 89 on the first line of the keyboard 88 correspond to a clickable map.

As in the above-mentioned embodiment, a http response representing the layout information 74 shown in FIG. 26 and the layout image 80 shown in FIG. 27 is generated in the conversion server 2. The generated http response is transmitted from the conversion server 2 to the digital camera 1, to display the layout image 80 shown in FIG. 27 on the display screen of the digital camera 1.

In a case where the layout image 80 shown in FIG. 27 is displayed, when the key image 89 "t" in the keyboard 88 is clicked by the user, a http request indicating that "t" is clicked is transmitted from the digital camera 1 to the conversion server 2. Consequently, layout processing is performed again in the conversion server 2, to respectively update the layout information and the layout image. A http response storing files respectively representing the updated layout information and layout image is generated in the conversion server 2. The generated http response is transmitted from the conversion server 2 to the digital camera 1. Further, the variable area of the entry item in the conversion server 2 is updated, as shown in FIG. 28, to store a character entered by the user (NAME="t").

Figures 29, 30:
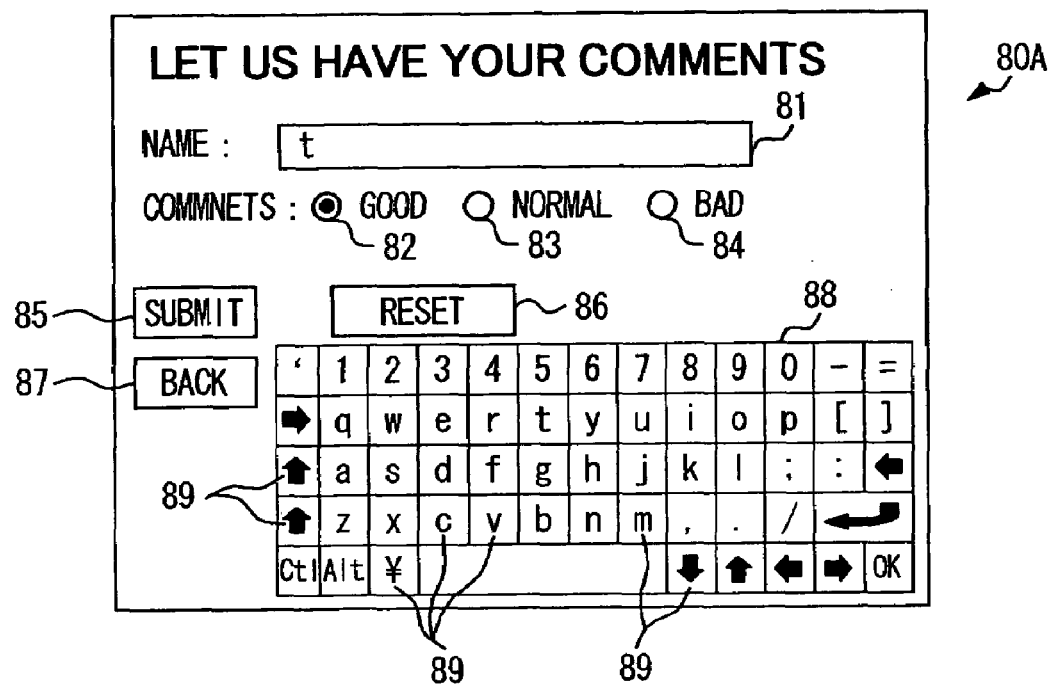
FIG. 29 illustrates an example of a layout image.
FIG. 30 illustrates an example of contents stored in a variable area of an entry item.

When the http response transmitted from the conversion server 2 is received in the digital camera 1, a layout image 80A after the update is displayed, as shown in FIG. 29, on the display screen of the digital camera 1. In the layout image 80A after the update, the character "t" entered by the user is displayed in the name display area 81. The user can enter a character even when the digital camera 1 has no character entering function using a clickable map, and can confirm the entered character.

When a character string "tanaka" is entered, for example, the entered character string is stored (NAME=tanaka), as shown in FIG. 30, in the variable area of the entry item in the conversion server 2.

When the operation of the digital camera 1 is terminated, and the submit button 85 is clicked, a http request (FIG. 31) storing data (name=tanaka&comment=GOOD, etc.) representing the contents of a character string entered into the digital camera 1 is transmitted from the conversion server 2 to the Web server 4. The Web server 4 can confirm the entered character string in the digital camera 1.

FIGS. 32 to 37 illustrate still another modified example.

In the modified example, a spurious clickable keyboard (a keyboard image) is displayed on the display screen of the digital camera 1. Any one of key images (key areas) composing the clickable keyboard is clicked, to copy a character image displayed on the clicked key image, and paste the copied character image to an area corresponding to a text entry box.

Figures 31, 32:
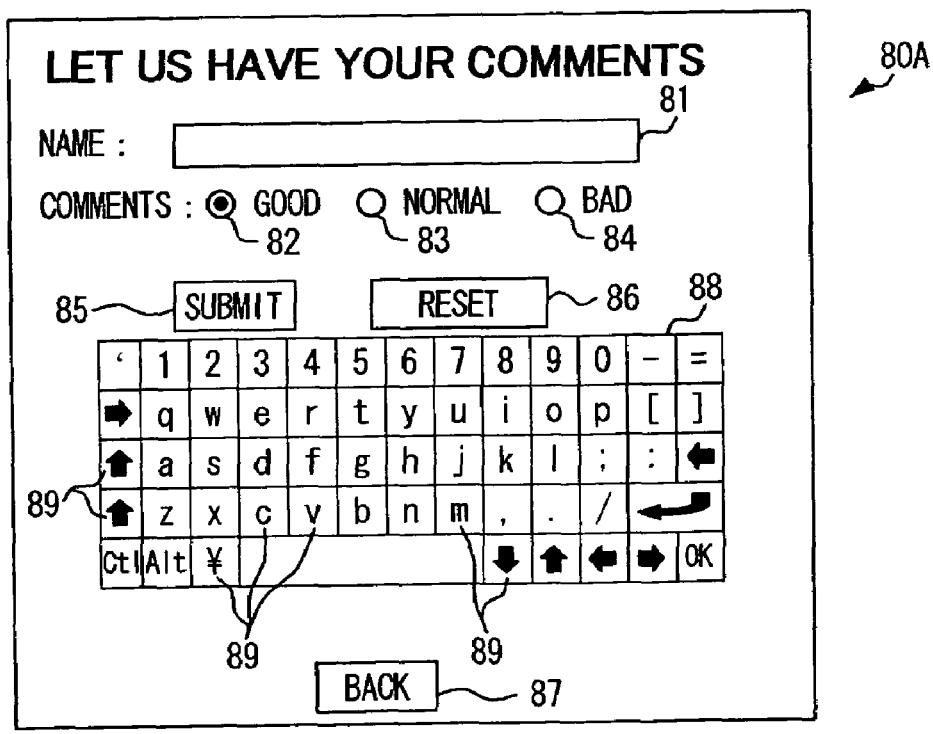
FIG. 31 illustrates an example of a http request.
FIG. 32 illustrates an example of a layout image.

FIG. 32 illustrates an example of a layout image.

As described in the foregoing, a http response transmitted from the conversion server 2 is received in the digital camera 1, to display a layout image 80A on the display screen of the digital camera 1. The layout image 80A is an image corresponding to one frame as a whole, as described above. Although the structure of the layout image 80A shown in FIG. 32 differs from the structure of the layout image 80 shown in FIG. 27 (it goes without saying that the structures may be the same), the same functions as the functions of the layout image 80 shown in FIG. 27 are assigned the same reference numerals and hence, the description thereof is not repeated. A character such as a letter or a numeral is formed in each of key areas 89 composing a clickable keyboard 88.

FIG. 33 illustrates the contents of layout information related to the layout image 80A shown in FIG. 32.

The second and third lines of the layout information represent a basic image serving as a base of the layout image 80A. Utilized as the layout image 80A is one having 320 pixels in width by 240 pixels in height, similarly to the above-mentioned layout image 80. The fourth line indicates the name of the basic image.

The fifth line indicates that a name display area 81 is an area corresponding to a text entry box. The sixth to eighth lines indicate that areas 82, 83, and 84 are areas respectively corresponding to radio buttons. The ninth line indicates that an area 85 is an area corresponding to a submit button. The tenth line indicates that an area 86 is an area corresponding to a reset button.

The 11-th to n-th lines respectively indicate the ranges of each of the key areas 89 composing the clickable keyboard 88 and the contents of a character formed in the key area 89. The m-th line indicates that an area 87 is an area corresponding to a back button.

When the layout image 80A is clicked, the position where the click is made is detected, and an information file is referred to, to find which area is clicked and which of the functions corresponds to the clicked area.

Figure 34:
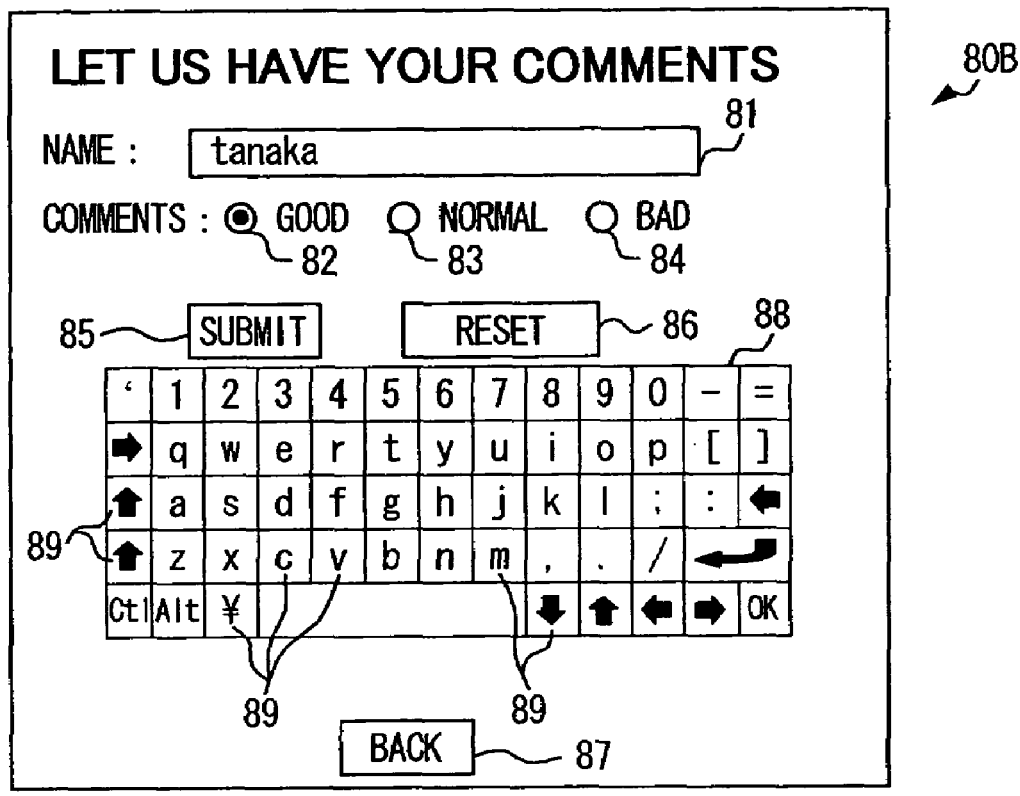
FIG. 34 illustrates an example of a layout image.

FIG. 34 illustrates an example of a layout image after a click of the clickable keyboard 88 by the user of the digital camera 1.

As described in the foregoing, in the modified example, when any one of the key areas 89 composing the clickable keyboard 88 is clicked, a character image formed in the clicked key area 89 is copied, and the copied character image is pasted on a name display area 81.

The key areas 89 respectively having characters "t", "a", "n", "a", "k" and "a" formed therein in the clickable keyboard 88, for example, are clicked in this order, thereby displaying characters "tanaka" as an image, as shown in FIG. 34, on the name display area 81.

Figure 35:
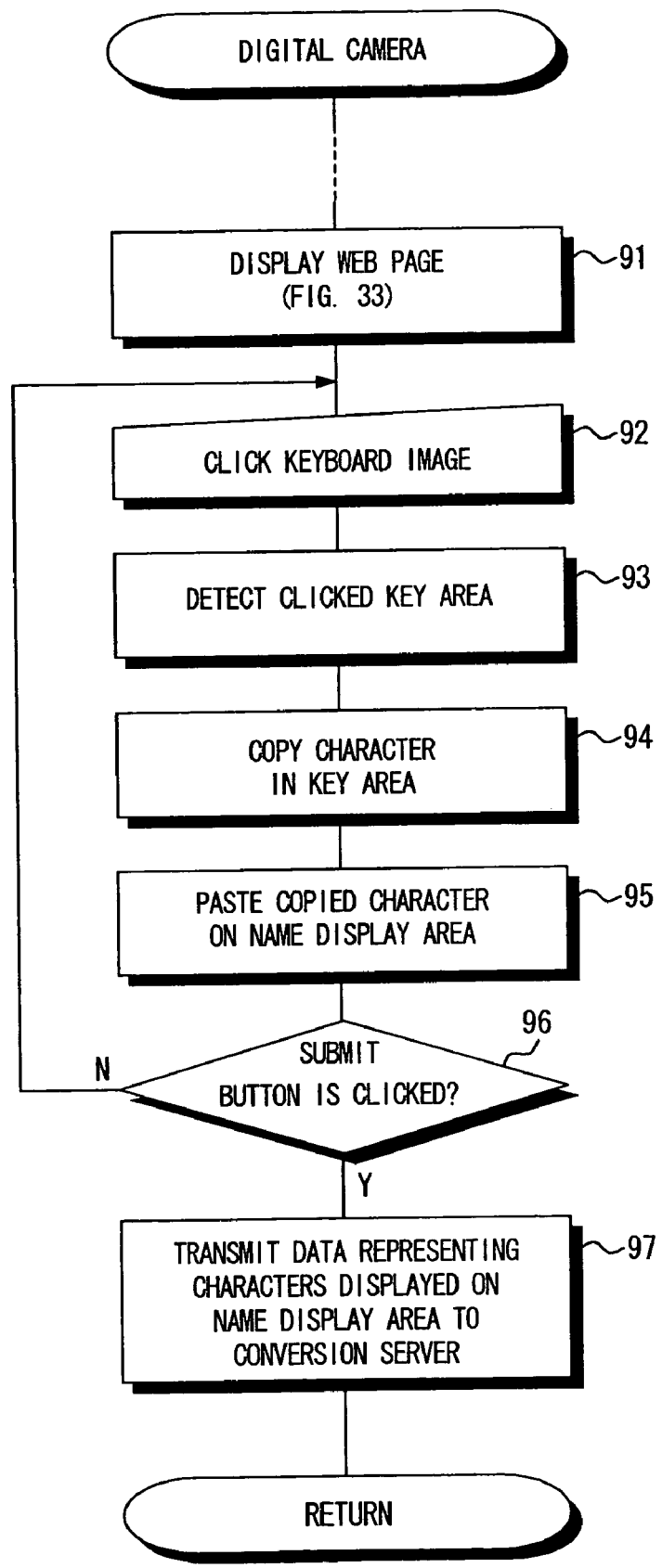
FIG. 35 is a flow chart showing a part of the procedure for processing of a digital camera.

FIG. 35 is a flow chart showing a part of the procedure for processing of the digital camera 1.

When a http response transmitted from the conversion server 2 is received in the digital camera 1, as described above, the layout image 80A shown in FIG. 32 is displayed on the display screen of the digital camera 1 (step 91).

When the clickable keyboard 88 included in the layout image 80A is clicked by the user of the digital camera 1 (step 92), it is detected which of the large number of key areas 89 composing the clickable keyboard 88 is clicked (step 93). It can be detected which of the key areas 89 is clicked on the basis of the layout information (see FIG. 33) representing the functions and others of the layout image 80A.

When the clicked key area 89 is detected, the range of the detected key area 89 is designated, and the character formed in the range is copied (step 94). The copied character is pasted on the name display area (a text box) 81 (step 95). Until the submit button display area 85 is clicked (step 96), processing for copying the character formed in the clicked key area 89 in response to the click of the key area 89 and pasting the copied character on the name display area 81 is repeated. The character formed in the key area 89 clicked by the user can be displayed on the name display area 81 without establishing communication between the digital camera 1 and the conversion server 2 every time the user clicks the key area 89.

The characters "t", "a", "n", "a", "k", and "a" in the key areas 89 in the clickable keyboard 88 are clicked in this order by the user of the digital camera 1, as described above, for example, so that the characters "tanaka" appear as an image on the name display area 81, as shown in FIG. 34.

When all the key areas 89 corresponding to the characters to be entered are clicked, the submit button display area 85 is clicked by the user (YES in step 96). Consequently, data representing the characters displayed on the name display area 81 is transmitted from the digital camera 1 to the conversion server 2 (step 97). The data representing the characters is transmitted from the conversion server 2 to the Web server 4, to recognize the contents of the characters entered in the digital camera 1 in the Web server 4.

Although in the above-mentioned embodiment, the clickable keyboard 88 is an image corresponding to one frame (the layout image 80A is an image corresponding to one frame), the key areas 89 composing the clickable keyboard 88 may be respectively images corresponding to independent frames.

Figure 36A:
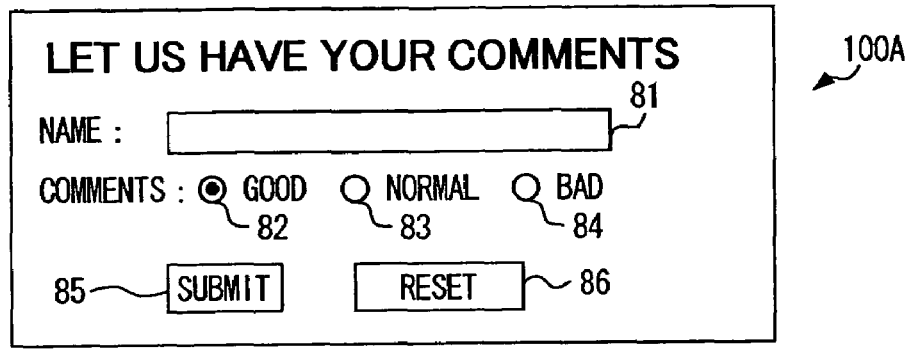
FIGS. 36A, 36B, and 36C illustrate an example of images composing a layout image.
Figure 36B:
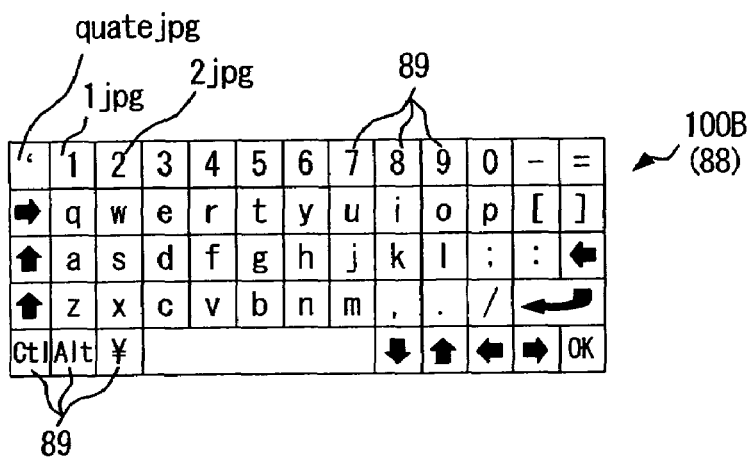
Figure 36C:
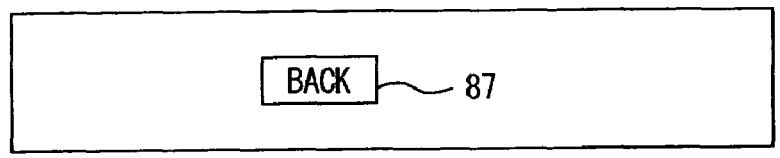

FIGS. 36A, 36B and 36C illustrate respective images composing the layout image 80A.

FIG. 36A illustrates a questionnaire image 100A which is an upper part of the layout image 80A. The questionnaire image 100A is an image corresponding to one frame. The questionnaire image 100A includes the name display area 81, the radio buttons 82, 83, and 84, the submit button display area 85, and the reset display area 86, described above.

FIG. 36B illustrates a set image 100B corresponding to the clickable keyboard 88 which is a central part of the layout image 80A. The set image 100B is a set of a lot of key images which are respectively independent (quatejpg, 1 jpg, 2 jpg, etc.), unlike the questionnaire image 100A. The set image 100B is composed of key images corresponding to frames whose number corresponds to the number of the key areas 89 composing the clickable keyboard 88.

FIG. 36C illustrates a back image 100C which is a lower part of the layout image 80A. The back image 100C is also an image corresponding to one frame, similarly to the questionnaire image 100A. The back image 100C includes the back display area 87.

FIG. 37 illustrates the contents of layout information related to the layout image 80A composed of FIGS. 36A, 36B, and 36C.

In a case where the key areas 89 composing the clickable keyboard 88 are respectively images corresponding to independent frames, the necessity of designating, when the character in the key area is copied, a range in which the character is to be copied, as described above, is eliminated. Therefore, the copying processing is relatively simplified.

In the layout information, the second and third lines indicate a first base image (an image in the upper half of the layout image 80A) having 320 pixels in width by 120 pixels in height, and the fourth line indicates the name of the first base image.

The fifth line indicates that the name display area 81 in the layout image 80A is an area corresponding to a text box. The sixth to eighth lines indicate that the areas 82, 83, and 84 respectively correspond to radio buttons. The ninth and tenth lines respectively indicate that the submit button display area 85 is an area corresponding to a submit button and the reset button display area 86 is an area corresponding to a reset button.

The 12-th line and the subsequent lines indicate that each of the key areas 89 composing the clickable keyboard 88 is independent image. Further, the coordinate position of each of the key areas 89 is also described. The contents of the character formed in the key area 89 at the position where the click is made are understood.

The m-th and (m+1)-th lines indicate an image serving as a base of the back image 100C, and indicate that the image has 320 pixels in width by 60 pixels in height. The (m+2)-th line indicates the name of the back image 100C.

The (m+3)-th line indicates that the area 87 is an area corresponding to a back button in the back image 100C.

In a case where the key images 89 composing the clickable keyboard 88 are thus respectively independent, when the character formed on the key image 89 is copied, as described above, the necessity of designating a range in which the character is to be copied is eliminated. It is possible to copy the character and paste an image representing the copied character to the questionnaire image 100A with relative ease. The character image is pasted to the questionnaire image 100A, to display the character formed in the clicked key area 89 on the name display area 81 in response to the click by the user, as shown in FIG. 34.

(2) Second Embodiment

Figure 38:
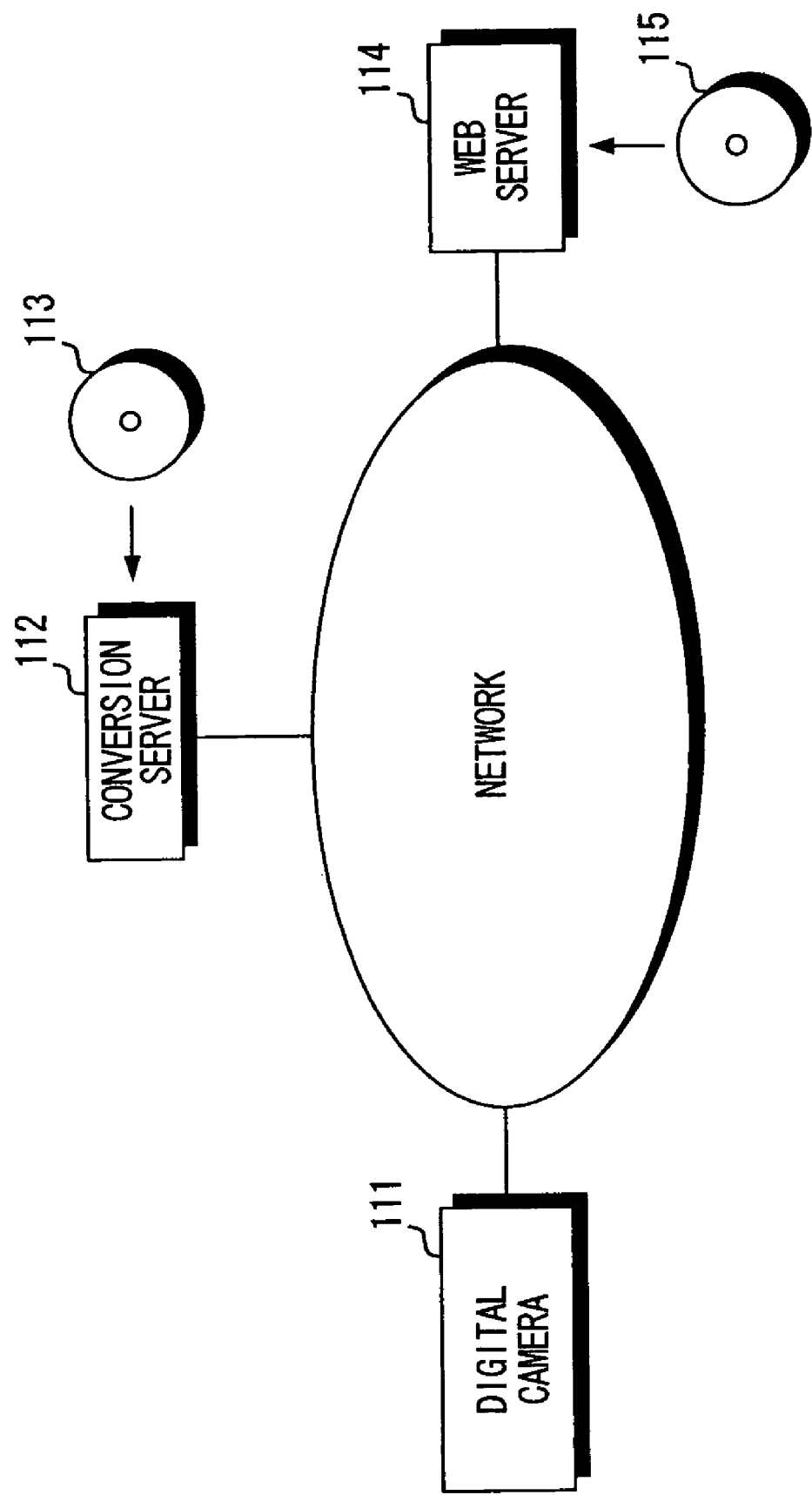
FIG. 38 illustrates the outline of a Web page conversion system.

FIG. 38 illustrates the outline of a Web page conversion system according to an embodiment of the present invention.

The Web page conversion system comprises a digital camera 111, a conversion server (a proxy server) 112, and a Web server 114. The digital camera 111, the conversion server 112, and the Web server 114 are connected to a network.

A CD-ROM (Compact Disc Read-Only Memory) 113 stores an operation program for the conversion server 112, as described later. The conversion server 112 is loaded with the CD-ROM 113, and the operation program stored in the CD-ROM 113 is installed in the conversion server 112, so that the conversion server 112 is operated, as described later. Similarly, a CD-ROM 115 stores an operation program for the Web server 114. The Web server 114 is loaded with the CD-ROM 115, and the operation program stored in the CD-ROM 115 is installed in the Web server 114, so that the Web server 114 is operated, as described later.

Each of the digital camera 111, the conversion server 112, and the Web server 114 comprises a communication circuit (not shown) for connection to the network. Further, each of the conversion server 112 and the Web server 114 comprises a CPU, a memory, a CD-ROM driver, a display device, a keyboard (any of which are not shown), and so on.

The digital camera 111 comprises a display device (not shown). The digital camera 111 has a lot of functions for displaying an image but has no or few functions for displaying a text represented by text data in many cases. When the text is included in a Web page, therefore, the text cannot, in some cases, be displayed. In the present embodiment, the text represented by the text data is imaged, thereby making it possible to display the text included in the Web page.

Figure 39:
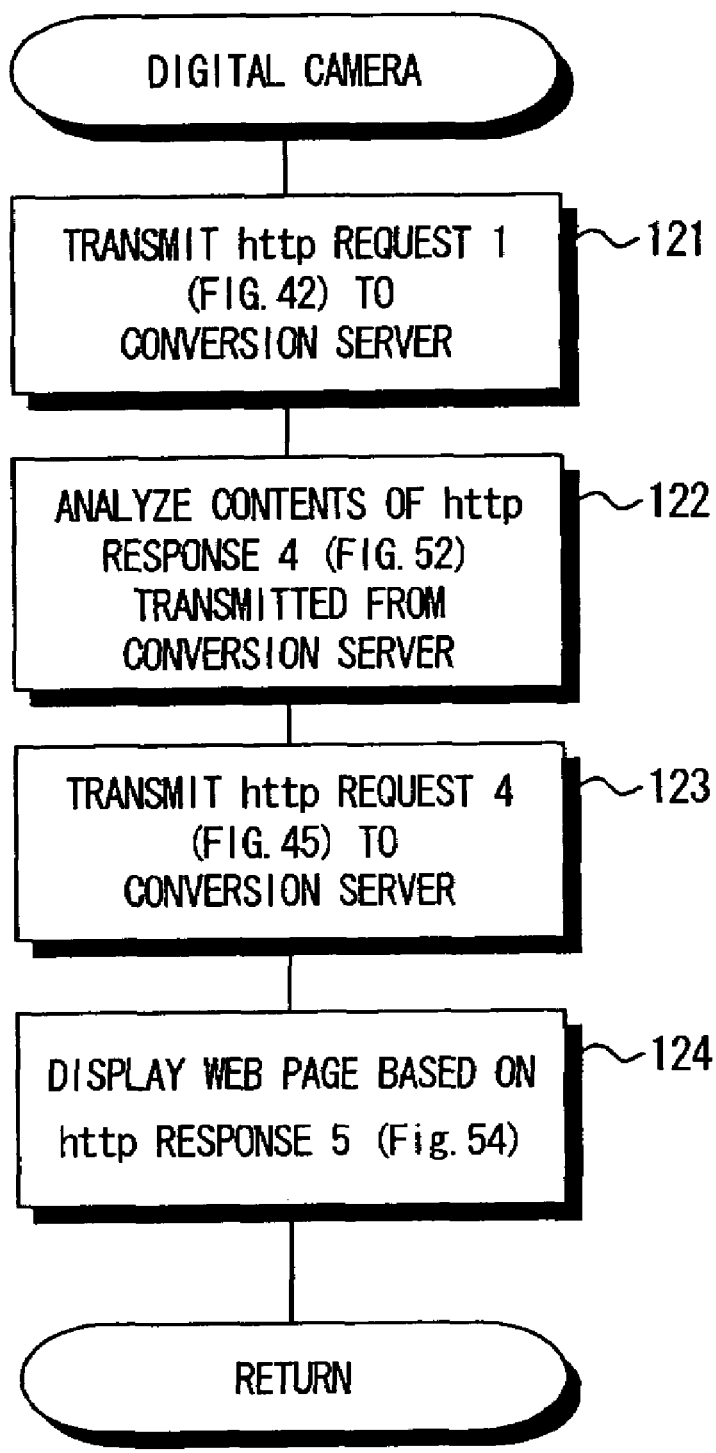
FIG. 39 is a flow chart showing the procedure for processing of a digital camera.
Figure 40:
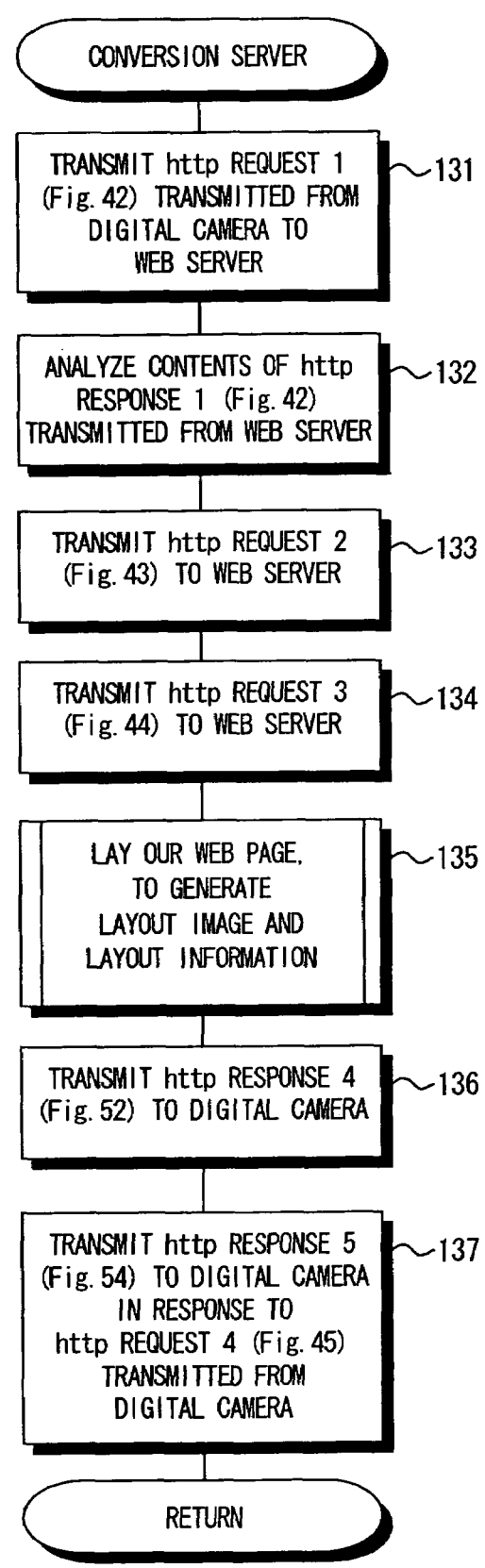
FIG. 40 is a flow chart showing the procedure for processing of a conversion server.

FIG. 39 is a flow chart showing the procedure for processing of the digital camera 111, FIG. 40 is a flow chart showing the procedure for processing of the conversion server 112, and FIG. 41 is a flow chart showing the procedure for processing of the Web server 114.

In processing described below, a http (hyper-text transfer protocol) request for acquiring a Web page is transmitted from the digital camera 111 to the conversion server 112. The http request is transmitted from the conversion server 112 to the Web server 114. In the Web server 114, a http response corresponding to the http request is generated. The generated http response is transmitted from the Web server 114 to the conversion server 112. In the conversion server 112, a file included in the http response transmitted from the Web server 114 is a html (hyper-text markup language) file, which is converted into an image file representing the Web page. The image file obtained by the conversion is transmitted from the conversion server 112 to the digital camera 111. Even the digital camera which cannot display a text represented by text data can see a text included in the Web page because the text is displayed as an image.

Let convert.net be the address of the conversion server 112, and let www.○○○.com be the address of the Web server 114.

A first http request is first transmitted from the digital camera 111 to the conversion server 112 (step 121 in FIG. 39: The digital camera 111 is set so as to access not the Web server 114 but the conversion server 112). The contents of the first http request are shown in FIG. 42. The first http request includes a command (GET) to acquire the Web page, the name (member.html) of a file representing the Web page to be acquired, the version (HTTP/1.1) of http, the address (HOST: www.○○○.com) of the server storing the file representing the Web page to be acquired, etc.

When the first http request transmitted from the digital camera 111 is received in the conversion server 112, the received http request is transmitted from the conversion server 112 to the Web server 114 (step 131 in FIG. 40).

Figure 46:
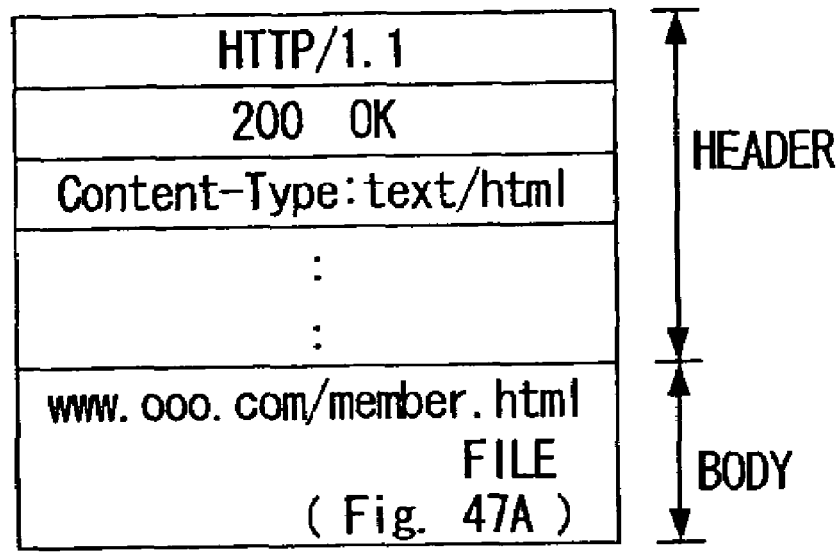

When the first http request transmitted from the conversion server 112 is received in the Web server 114, a first http response shown in FIG. 46 is generated in response to the received first http request. The first http response includes a header and a body. The header includes the version (HTTP1.1) of the first http response, a status code (200 OK), the type of contents (Content-Type:text/html) included in the body, etc. The body stores a html file (www.○○○.com/member.html) requested by the first http request. The contents of the html file are illustrated in FIG. 47A. Further, a Web page represented by the html file is illustrated in FIG. 47B.

In FIG. 47A, the second to fourth lines indicate the header of the html file, and the fifth to 26-th lines indicate the body of the html file.

In FIG. 47B, in a Web page W, a member introduction table t is displayed under a text T1 "member introduction" represented by text data. The member introduction table t includes for each line the name of a member, an e-mail address of the member, an image representing the member, etc. On the first line, a member's name "tanaka" is represented by a clickable text area C1. On the first line, an e-mail address T2 represented by text data and an image I1 represented by an image file are also included. Similarly, a clickable text area C2, an e-mail address T3 represented by text data, and an image I2 represented by an image file are included on the second line, and a clickable text area C3 and an e-mail address T4 represented by text data are included on the third line. Further, a clickable text area C4 is formed under the member introduction table t.

Referring to FIG. 47A, the text T1 "member introduction" in the Web page W shown in FIG. 47B is displayed by a tag on the sixth line. Further, the clickable text areas C1, C2, C3, and C4 in the Web page W are respectively formed by tags on the ninth, 14-th, 19-th, and 24-th lines. The texts T2, T3, and T4 are respectively displayed by tags on the tenth, 15-th, and 20-th lines. Further, the images I1 and I2 are respectively displayed by tags on the 11-th and 16-th lines. It should be understood that the Web page shown in FIG. 47B is displayed by the html file shown in FIG. 47A.

Referring to FIG. 41, the first http response generated in the Web server 114 is transmitted from the Web server 114 to the conversion server 112 (step 141).

When the first http response transmitted from the Web server 114 is received in the conversion server 112, the contents of the first http response are analyzed in the conversion server 112 (step 132 in FIG. 40). As a result of the analysis, the conversion server 112 requires a file or the like (material data) required to generate the Web page W from the Web server 114. In the present embodiment, in order to display the images I1 and I2 in the Web page W, a second http request shown in FIG. 43 and a third http request shown in FIG. 44 are transmitted from the conversion server 112 to the Web server 114 (steps 133 and 134 in FIG. 40). A file name to be acquired in the second http request shown in FIG. 43 stores the name (tanaka.jpg) of a file representing the image 11, and a file name to be acquired in the third http request shown in FIG. 44 stores the name (suzuki.jpg) of a file representing the image 12, to issue to the Web server 114 requests to transmit the file representing the image 11 and the file representing the image 12 (material data) by transmitting the first http request and the second http request from the conversion server 112 to the Web server 114.

Figure 48:
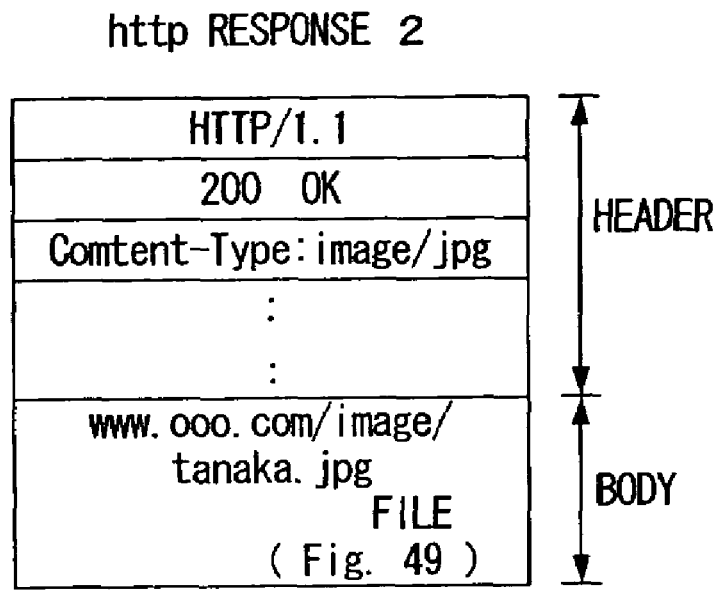
FIG. 48 illustrates an example of a http response.
Figure 50:
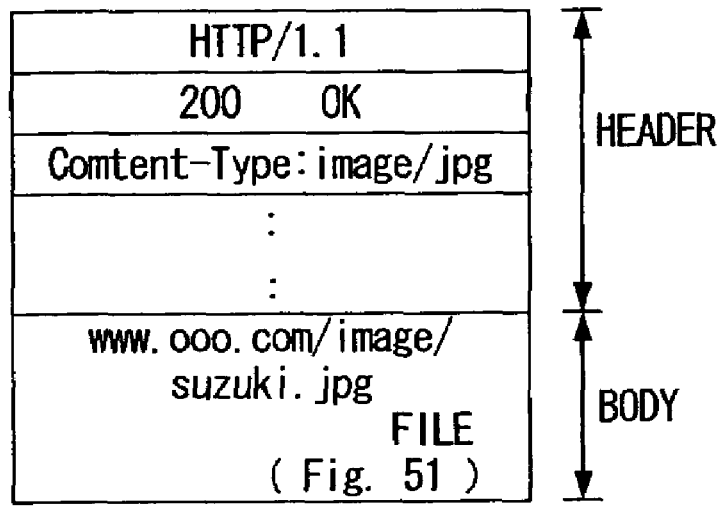
FIG. 50 illustrates an example of a http response.

When the second http request and the third http request transmitted from the conversion sever 112 are received in the Web server 114, a second http response shown in FIG. 48 and a third http response shown in FIG. 50 are generated in response to the second http request and the third http request. The generated second http response and third http response are transmitted from the Web server 114 to the conversion server 112 (steps 142 and 143 in FIG. 41).

Figure 49:
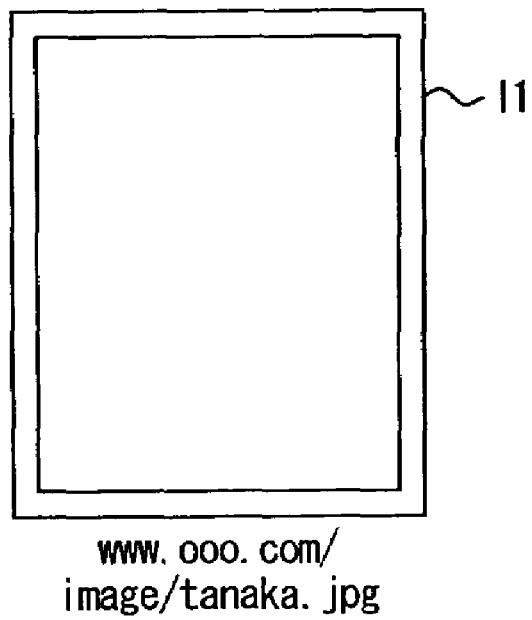
FIG. 49 illustrates an example of an image included in a Web page.

Referring to FIG. 48, the body of the second http response stores an image file (tanaka.jpg) requested by the second http request. An image I1 shown in FIG. 49 is represented by the image file included in the body of the second http response.

Figure 51:
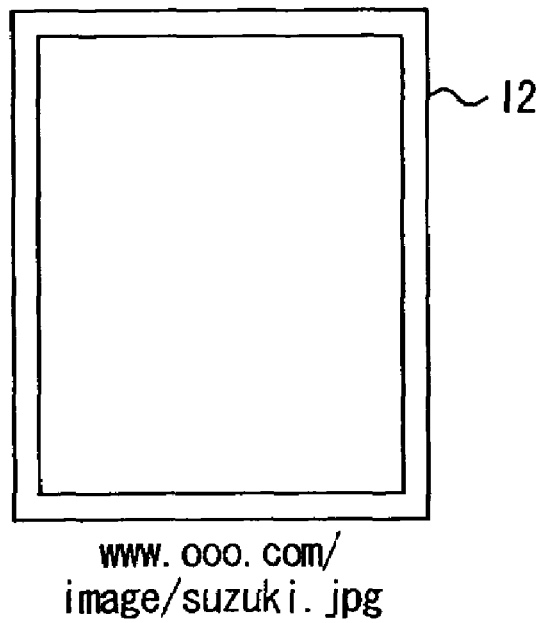
FIG. 51 illustrates an example of an image included in a Web page.

Similarly, referring to FIG. 50, the body of the third http response stores an image file (suzuki.jpg) requested by the third http request. An image 12 shown in FIG. 51 is represented by the image file included in the body of the second http response.

Figure 55:
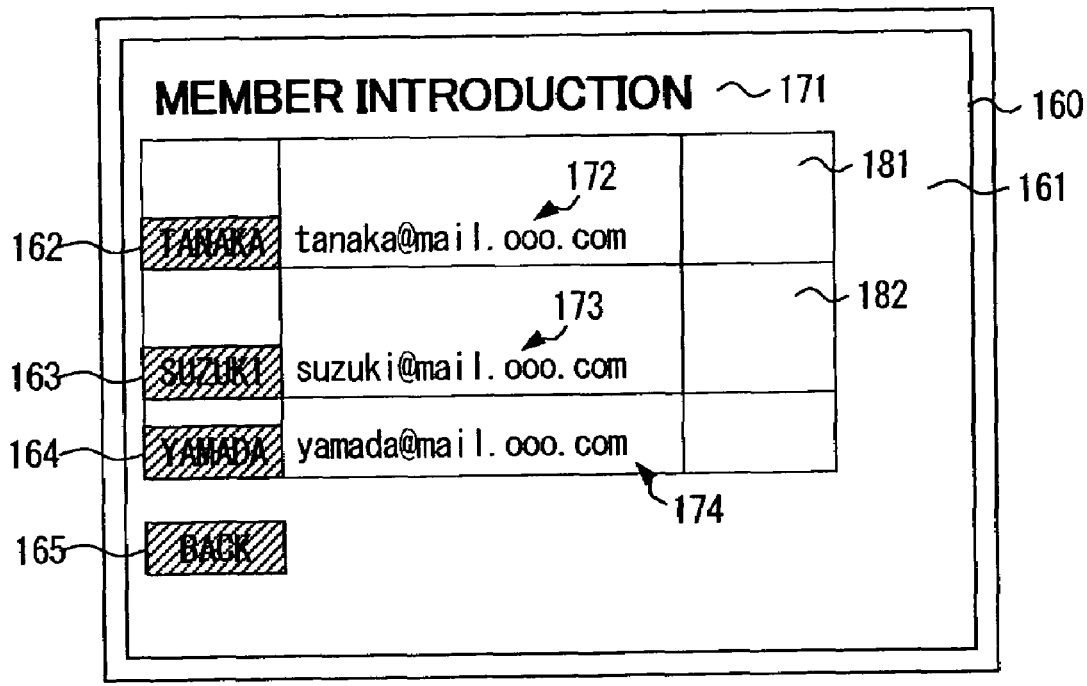
FIG. 55 illustrates an example of a Web page in which a text represented by text data is imaged.

Returning to FIG. 40, when all the image files and others required to generate the Web page are obtained, layout processing of the Web page is performed, to respectively generate layout information shown in FIG. 53 and a layout image (a Web page image) shown in FIG. 55 (step 135). The layout processing will be described in detail later. Consequently, a fourth http response shown in FIG. 52 is transmitted from the conversion server 112 to the digital camera 111 (step 136).

Although a layout image 160 shown in FIG. 55 is approximately the same as the Web page W shown in FIG. 47, the layout image 160 shown in FIG. 55 is an image corresponding to one frame, and texts included in the layout image 160 are all imaged. Although the layout image 160 includes a text 171 "member introduction" and texts 172, 173, and 174 which are respectively e-mail addresses, the texts are not represented by text data but are represented as images. Although the layout image 160 also includes areas 162, 163, 164, and 165 respectively representing clickable texts, it goes without saying that they are respective mere images composing a clickable map, and are not respectively linked so as to be clickable to the text areas on the layout image 160. Further, the layout image 160 also includes images 181 and 182 corresponding to the images I1 and I2.

The fourth http response has a layout information file shown in FIG. 53 stored in its body.

A base image of the layout image is defined by the sixth to eighth lines of the layout information file. Similarly, the ninth, tenth, 11-th, and 12-th lines respectively indicate that the areas 162, 163, 164, and 165 are clickable areas.

Figure 54:
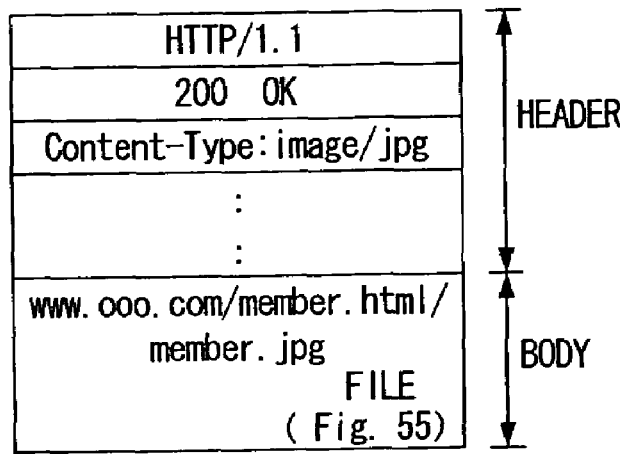
FIG. 54 illustrates an example of a http response.

When the fourth http response transmitted from the conversion server 112 is received in the digital camera 111, the contents of the fourth http response are analyzed in the digital camera 111 (step 122 in FIG. 39). Consequently, a fourth http request shown in FIG. 45 is transmitted from the digital camera 111 to the conversion server 112 (step 123 in FIG. 39). The fourth http request includes a request to acquire the layout image generated in the conversion server 112 (www.○○○.com/member.html/member.jpg). The fourth http request is received in the conversion server 112, to transmit a fifth http response (see FIG. 54) having an image file, representing a layout image corresponding to one frame generated in the conversion server 112, included in its body from the conversion server 112 to the digital camera 111 (step 137 in FIG. 40).

When the fifth http response transmitted from the conversion server 112 is received in the digital camera 111, the layout image (see FIG. 55) represented by the image file included in the body of the fifth http response is displayed on the display screen of the digital camera 111 (step 124 in FIG. 39). Even when the digital camera 111 cannot display a text represented by text data, it can display the text. Further, even when the text represented by the text data cannot be displayed without changing its font, the text can be displayed using its font.

The layout information file is given to the digital camera 111. When the area 162, 163, 164, or 165 is clicked, therefore, it is found that the area is clicked. By transmitting data indicating that the area 162, 163, 164, or 165 is clicked to the conversion server 112, a new Web page will be displayed on the display screen of the digital camera 111 in response to the click.

FIGS. 56A to 62C illustrate the layout processing (processing in the step 135 shown in FIG. 40).

Figures 56A, 56B, 56C:
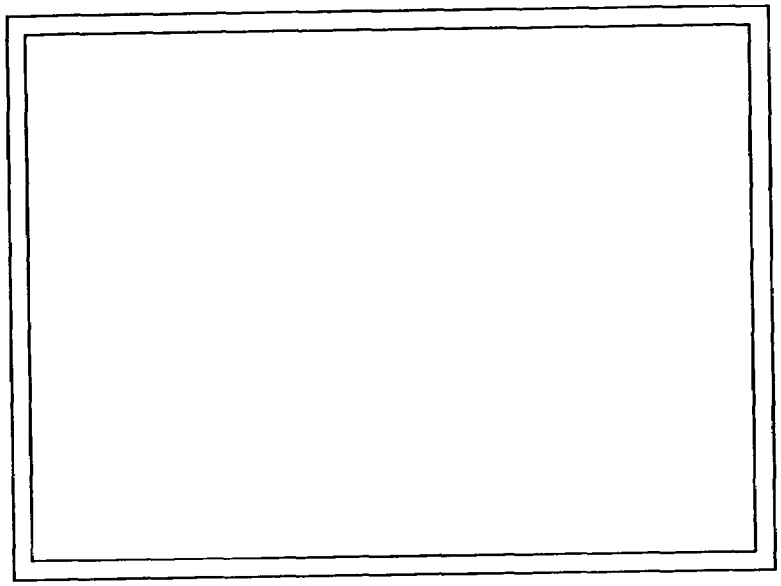
FIG. 56A illustrates the contents of a part of a html file.
FIG. 56B illustrates a part of a layout image.
FIG. 56C illustrates a part of layout information.

FIG. 56A illustrates a portion P11 on the first to fourth lines of the html file (FIG. 47) transmitted from the Web server 114. A base image of a layout image shown in FIG. 56B and a portion P21 of layout information shown in FIG. 56C are generated using the portion P11 on the first to fourth lines.

The base image shown in FIG. 56B has 320 pixels in width by 240 pixels in height, and the size thereof (including the color, the brightness, etc. thereof, as required) is previously determined. The first to fifth lines of the portion P21 of the layout information shown in FIG. 56C correspond to the portion P11 which is a part of the html file. The sixth to eighth lines of the portion P21 of the layout information indicate that an image "http://convert.net/www.○○○.com/member.html/member.jpg" having 320 pixels in width by 240 pixels in height is used under the name of "member map".

The portion P11 on the first to fourth lines of the html file is read by the conversion server 112, to generate the portion of the layout image shown in FIG. 56B and the portion P21 of the layout information shown in FIG. 56C which are previously determined.

Figure 57B:
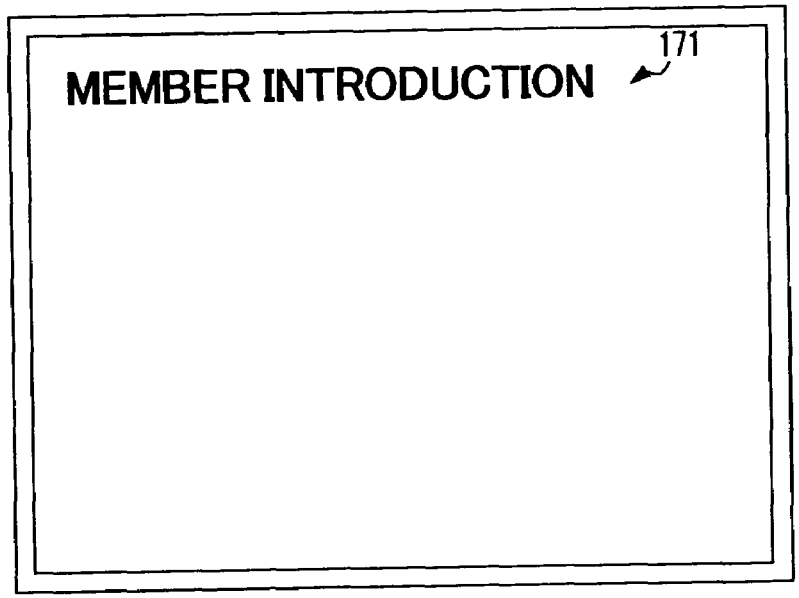
FIGS. 57A and 58A respectively illustrate the contents of parts of a html file, and FIGS. 57B and 58B respectively illustrate parts of a layout image.

FIG. 57A illustrates a portion P12 on the sixth line of the html file transmitted from the Web server 114. A layout image in which a text 171 "member introduction" is imaged is generated, as shown in FIG. 57B, using the portion P12 on the sixth line.

Figure 58A:
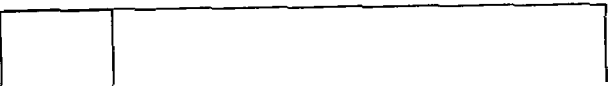
Figure 58B:
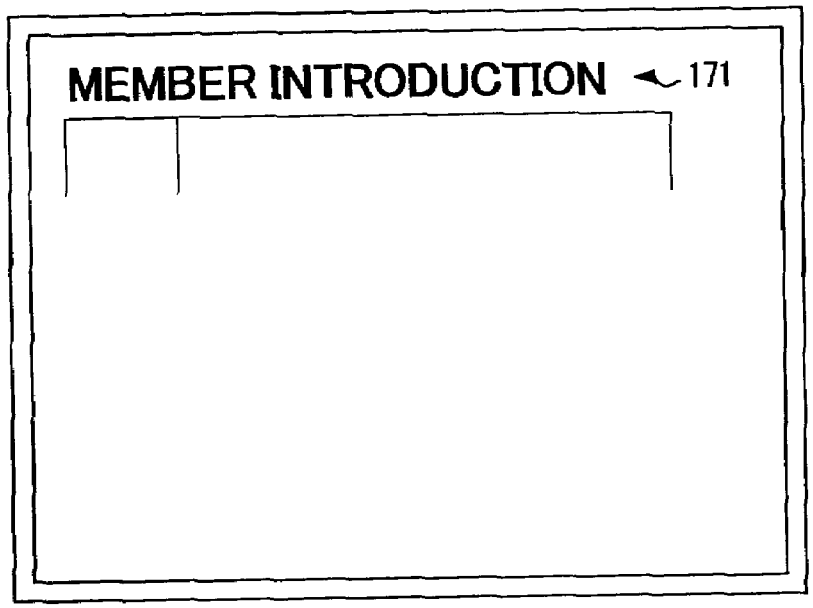

FIG. 58A illustrates a portion P13 on the seventh line of the html file transmitted from the Web server 114. An image representing a table is generated in a layout image, as shown in FIG. 58B, using the portion P13 on the seventh line.

Figures 59A, 59B, 59C:
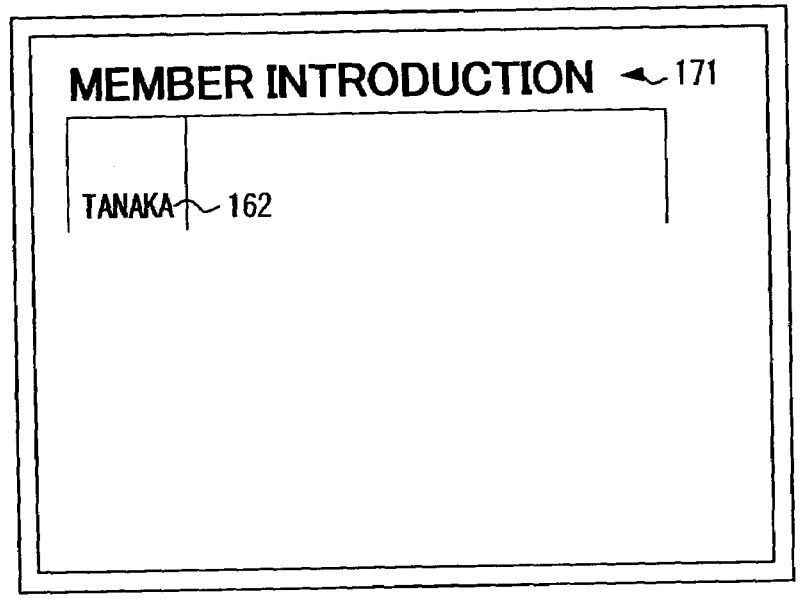
FIG. 59A illustrates the contents of a part of a html file.
FIG. 59B illustrates a part of a layout image.
FIG. 59C illustrates a part of layout information.

FIG. 59A illustrates a portion P14 on the eighth and ninth lines of the html file transmitted from the Web server 114. A layout image in which an imaged text (a name "tanaka") is displayed in an area 162 of the first frame on the first line of the table is generated, as shown in FIG. 59B, using the portion P14 on the eighth line. The eighth line of the html file indicates that "tanaka" is a clickable area. Therefore, information indicating that the area 162 in the layout image shown in FIG. 59B is an area corresponding to the clickable area is added to the layout information, as indicated on the 8.1-th line in FIG. 59C. The 8.1-th line indicates that the rectangular area 162 passing through coordinates (8, 64) and coordinates (24, 72) is a clickable area.

Figures 60A, 60B:
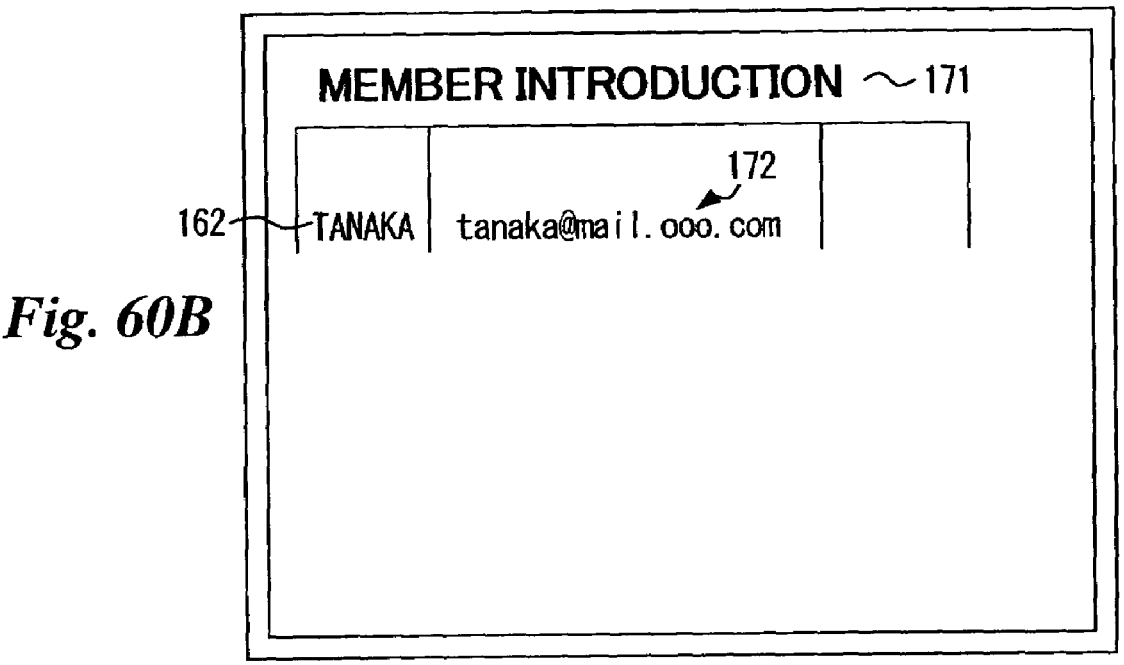
FIGS. 60A and 61A respectively illustrate the contents of parts of a html file, and FIGS. 60B and 61B respectively illustrate parts of a layout image.

FIG. 60A illustrates a portion P15 on the tenth line of the html file transmitted from the Web server 114. A part of a layout image in which a text 172 is imaged in an area of the second frame on the first line of a table is generated, as shown in FIG. 60B, using the portion P15 on the tenth line.

Figures 61A, 61B:
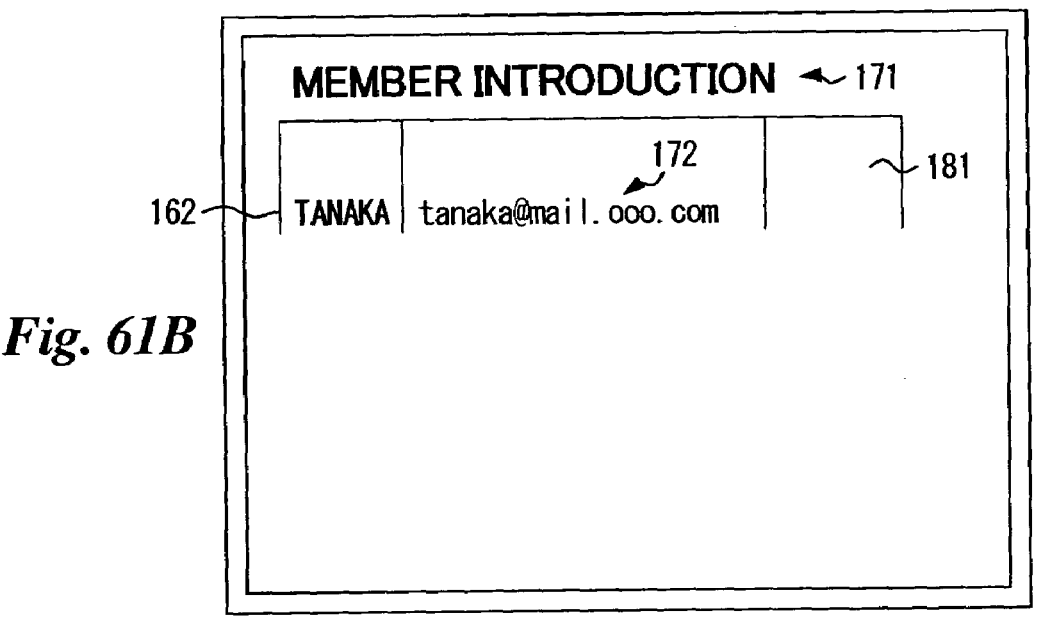

FIG. 61A illustrates a portion P16 on the 11-th line of the html file transmitted from the Web server 114. A part of a layout image in which an image 181 is affixed to an area of the third frame on the first line of a table is generated, as shown in FIG. 61B, using the portion P16 on the 11-th line.

FIG. 62A illustrates a portion P17 on the 12-th to 14-th lines of the html file transmitted from the Web server 114. A layout image in which an imaged text (a name "suzuki") is displayed in an area 162 of the first frame on the second line of a table is generated, as shown in FIG. 62B, using the portion P17 on the 14-th line. The 14-th line of the html file indicates that "suzuki" is a clickable area. Therefore, information indicating that the area 162 in the layout image shown in FIG. 62B is a clickable area is added to the layout information, as indicated on the 8.2-th line in FIG. 62C. The 8.2-th line indicates that the rectangular area 162 passing through coordinates (8, 11) and coordinates (24, 120) is a clickable area.

In the same manner, a layout image which is a Web page in which a text represented by text data is imaged and layout information representing the meaning of the layout image (the meaning of the position or the like of a clickable area) are generated.

Although in the above-mentioned embodiment, the digital camera 111 accesses the conversion server 112, a device to which the present invention is applied is not limited to the digital camera. For example, the present invention is also applicable to other devices which cannot easily display a text represented by text data.

Although in the above-mentioned embodiment, the digital camera 111 substantially obtains a file for displaying a Web page from the Web server 114 through the conversion server 112, a computer device or the like which can display a text represented by text data will directly access the Web server 114 without accessing the conversion server 112. In the case, the necessity of processing for imaging the text represented by the text data will be eliminated, as described above.

Furthermore, although in the above-mentioned embodiment, the conversion server 112 and the Web server 114 are separate servers, an image server common to the conversion server 112 and the Web server 114 may be configured.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A Web page display system comprising a camera operable by a user, a conversion server, and a Web server, which are communicably linked to each other, said camera comprising:
    a first Web page transmission request device adapted to transmit a transmission request for data representing a Web page to said conversion server,
    a display device for displaying an image representing the web page,
    a second judgment device for judging whether or not the action corresponding area included in the mapped image data displayed on the display screen of said display device is clicked, and
    a click content transmission device for transmitting, in response to the judgment by said second judgment device that the action corresponding area is clicked, data representing the content of the click to said conversion server, said conversion server comprising:
    a second Web page transmission request device for transmitting the transmission request for data representing a Web page transmitted from said camera to said Web server, an update Web page image data generation device for generating data representing a Web page obtained by updating a portion of said mapped image depending on the content of the click on the basis of the data representing the content of the click transmitted from said camera without communicating with the Web server, and an update Web page image data transmission device for transmitting to said camera the mapped image data after the update generated by said update Web page image data generation device, said Web server comprising:

an html file transmission device for transmitting an html file representing a Web page to said conversion server based upon the request from said conversion server, said conversion server further comprising:

a conversion device for converting the html file representing the Web page into mapped image data representing the Web page wherein the mapped image data representing the Web page can be displayed on the display device of said camera, a Web page image data transmission device for transmitting the mapped image data to said camera, a first judgment device for judging whether or not data representing an action area, where a Web page is changed in response to a click, is included in the html file, a layout information generation device for generating, in response to the judgment by said first judgment device that the data representing the action area is included in the html file, layout information in order to judge that an image area corresponding to an action area in the image data representing the Web page is clicked, and a layout information transmission device for transmitting the generated layout information to said camera.

2. The system according to claim 1, wherein said conversion device in said conversion server converts text data included in the html file transmitted from said Web server into image data.

3. The system according to claim 2, further comprising:
a third judgment device for judging whether or not the text data is included in the html file,
said conversion device converting, in response to the judgment by said third judgment device that the text data is included in the html file, the text data into the image data.

4. The system according to claim 1, said conversion server comprising a material request transmission device for transmitting to said Web server a request for material data composing the Web page represented by said mapped image data,
said Web server comprising a material data transmission device for transmitting the material data to said conversion server depending on the material request transmitted from said conversion server, and
said conversion device in said conversion server generating said mapped image data using the material data transmitted from said Web server.

5. The system according to claim 1, wherein the camera is a digital camera, the first Web page transmission request device and the display device being integrated therein.

6. The system according to claim 1, wherein a layout image of the camera includes means for the user to enter and transmit comments.

7. The system according to claim 1, wherein a layout image of the camera includes an image of an alphanumerical keyboard.

8. The system according to claim 1, said conversion server comprising:
an update content storing device for storing the data representing the content of the click transmitted from said camera, and
an update content transmission device for transmitting to said Web server the data representing the content of the click stored by said update content storing device.

9. A conversion server capable of mutually communicating with an camera that is operable by a user, the camera having a display device for displaying an image representing a web page,
said conversion server comprising:
a Web page transmission request device for transmitting a transmission request for data representing a Web page transmitted from said camera to said Web server,
an html file receiving device for receiving an html file representing a Web page transmitted from said Web server,
a conversion device for converting the html file representing the Web page into mapped image data representing a Web page wherein the mapped image data representing the Web page can be displayed on the display device of said camera,
a Web page image data transmission device for transmitting the mapped image data to said camera,
a first judgment device for judging whether or not data representing an action area, where a Web page is changed in response to a click, is included in the html file,
a layout information generation device for generating, in response to the judgment by said first judgment device that the data representing the action area is included in the html file, layout information in order to judge that an image area corresponding to an action area in the mapped image data representing the Web page is clicked,
a layout information transmission device for transmitting the generated layout information to said camera,
a receiving device for receiving, in response to the action corresponding area being clicked in said camera, data representing the content of the click transmitted from said camera,
an update Web page image data generation device for generating data representing a Web page obtained by updating a portion of said mapped image depending on the content of the click on the basis of the data representing the content of the click received by the receiving device without communicating with the Web server, and
an update Web page image data transmission device for transmitting to said camera the mapped image data after the update generated by said update Web page image data generation device.

10. The conversion server according the claim 9, wherein the updated portion of the mapped image after the update corresponds to said action area.

11. The conversion server according to claim 9, wherein the updated portion of the mapped image after the update corresponds to an area different from said action area.

12. The conversion server according to claim 9, wherein said action area corresponds to a clickable keyboard, and
a character corresponding to the click of said keyboard is displayed as the updated portion of the mapped image after the update.

13. The conversion server according to claim 9, wherein said conversion device converts text data included in the html file into image data.

14. The conversion server according to claim 13, further comprising
 a second judgment device for judging whether or not the text data is included in the html file,
 said conversion device converting, in response to the judgment by said second judgment device that the text data is included in the html file, the text data into the image data.

15. The conversion server according to claim 9, wherein the camera is a digital camera, the first Web page transmission request device and the display device being integrated therein.

16. The conversion server according to claim 9, wherein a layout image of the camera includes means for the user to enter and transmit comments.

17. The conversion server according to claim 9, wherein a layout image of the camera includes an image of an alphanumerical keyboard.

18. The conversion server according to claim 9, further comprising:
 an update content storing device for storing the data representing the content of the click transmitted from said camera, and
 an update content transmission device for transmitting to said Web server the data representing the content of the click stored by said update content storing device.

* * * * *